United States Patent [19]
Dunn

[11] Patent Number: 6,149,436
[45] Date of Patent: Nov. 21, 2000

[54] STRING ART DEVICE

[76] Inventor: Tristram C. Dunn, 4 Walmsley Rd., Darien, Conn. 06820

[21] Appl. No.: 09/481,475

[22] Filed: Jan. 11, 2000

[51] Int. Cl.[7] .................................................. G09B 11/00
[52] U.S. Cl. ............................................... 434/83; 434/81
[58] Field of Search ......................... 434/81, 83; 428/32; 496/490

[56] References Cited

U.S. PATENT DOCUMENTS

| | | |
|---|---|---|
| 2,728,149 | 12/1955 | Radt .............................................. 434/83 |
| 2,798,328 | 7/1957 | Fasino ........................................ 434/83 |
| 2,984,488 | 5/1961 | Kirchner . | |
| 3,038,272 | 6/1962 | Colston ...................................... 434/83 |
| 3,589,034 | 6/1971 | Beecham ................................... 434/83 |
| 3,690,998 | 9/1972 | Brynjegard ................................ 434/83 |
| 3,752,730 | 8/1973 | Koff ........................................... 434/83 |
| 3,905,133 | 9/1975 | Charman ................................... 434/83 |
| 4,006,540 | 2/1977 | Lemelson ................................. 434/83 |
| 4,012,010 | 3/1977 | Friedman .................................. 434/83 |
| 4,540,375 | 9/1985 | Fogarty et al. ........................... 434/83 |
| 4,979,749 | 12/1990 | Onanian . | |
| 6,065,968 | 5/2000 | Corliss ..................................... 434/83 |

*Primary Examiner*—Sam Rimell
*Attorney, Agent, or Firm*—Robert A. Seemann

[57] ABSTRACT

A plurality of layers of thread, each sculptured by stringing, each higher layer strung around a larger diameter opening, forming a portion of a wing, and so strung symmetrically, forming a pair of wings, and forming a butterfly sculpture.

16 Claims, 28 Drawing Sheets

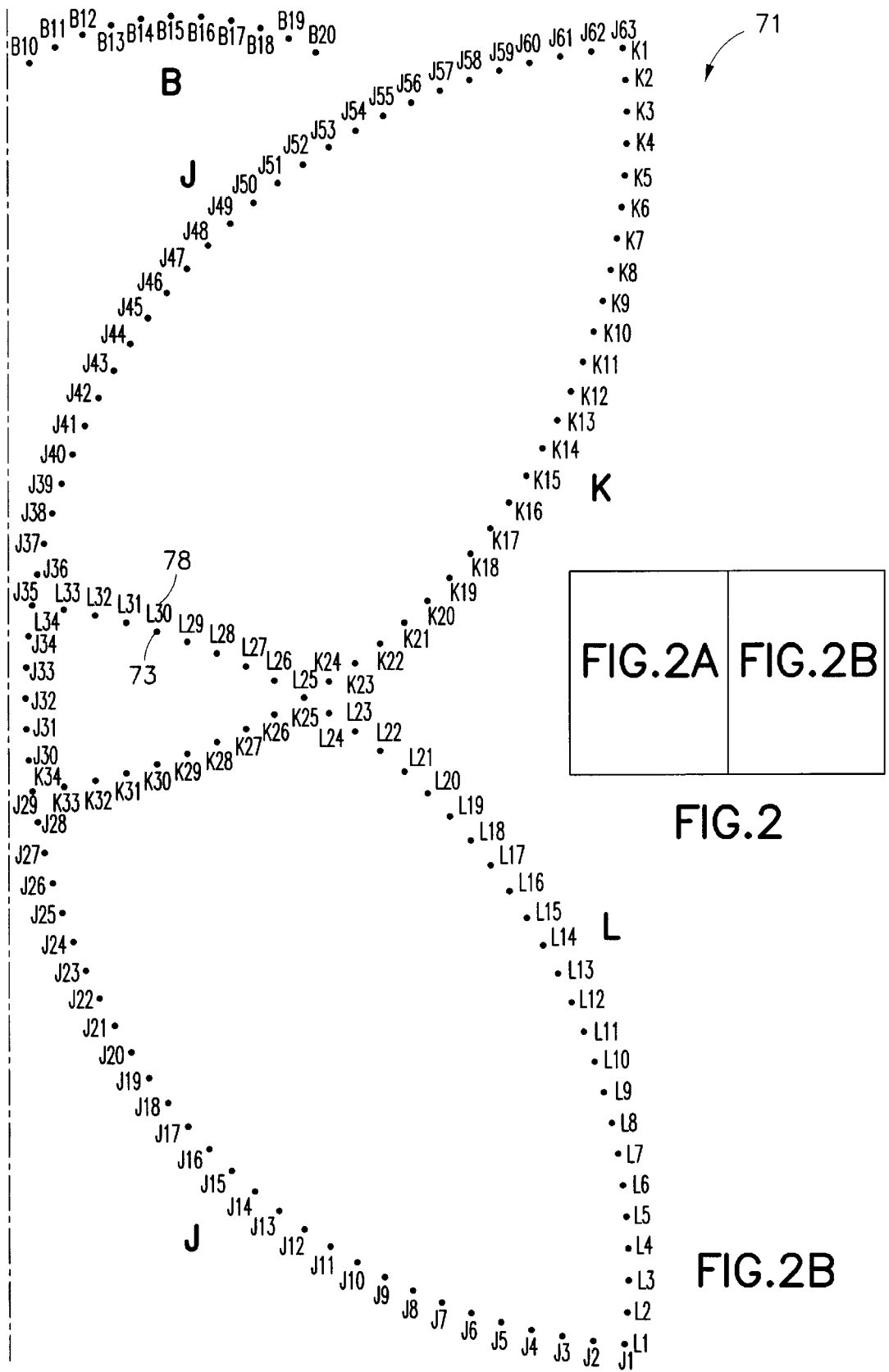

STRING ART DEVICE

BACKGROUND OF THE INVENTION

1. Field of the Invention

The invention pertains to visual art and craft demonstration, more specifically to designs made by strung colored filament.

2. Description of the Prior Art

U.S. Pat. No. 2,728,149 patented Dec. 27, 1955 by M. Radt describes a plurality of pins uniformly spaced in a circle mounted on a base. The pins are given sequential identifying numbers which are marked on the base alongside the each pin.

The total number of pins in the circle is equal to a prime number. A string is attached to any one of the pins, and is stepwise conducted to others of the pins while skipping an always equal number of intermediary pins until contact has been made with all the pins. Upon returning to the starting point, all pins are contacted an equal number of times.

U.S. Pat. No. 2,984,488, patented May 16, 1961 by S. Kirchner, describes a board having a multiplicity of pin-receiving holes. A flexible sheet is adapted to overlay the board. The sheet has a multiplicity of perforations that form an illegible picture or design. Removable pins are inserted through the holes in the sheet, and into the holes in the board. Areas of the sheet which do not have holes conceal holes in the board. Rubber bands of different color are looped over selected sets of pins, forming a picture.

U.S. Pat. No. 3,905,133 patented Sep. 16, 1975 by P. Charman describes a plurality of strips. Each strip includes a resilient spine. A plurality of pins, each pin having an enlarged portion or cap to prevent thread from falling off the free end of the pin, is attached to and protruding from one face of the spine. The opposite face of the spine has a set of projecting plugs that are adapted to inserted into selected holes in a baseboard so that the strips can be mounted on the board in a choice of different positions. Thread is strung between pins from one strip to another. The spine is adapted to flex at least in the plane of the board.

U.S. Pat. No. 4,540,375, patented Sep. 10, 1985 by Fogarty et al. describes a flexible plate having a plurality of upward extending, flexible fingers arrayed in equally spaced, parallel, transverse rows on the top of the plate. A tool having an internal reel of string, dispenses the string through a tubular tip which a person extends into the fingers and moves around among the fingers to lay out the string in a design below the tops of the fingers.

SUMMARY OF THE INVENTION

It is one object of the invention to provide a three dimensional tactile art item.

It is another object that the three dimensional tactile art item is made by wrapping string about pins.

It is another object that the pins driven into a board according to directions on a sheet through which the nails are driven into the board.

It is another object that the string is a plurality of pieces of different colored yarn, and that the string is wrapped in layers on the board.

A plurality of pins are mounted in a base in a predetermined pattern of pins in a line that includes outline by the pins of a loop, a first length of string wrapped around a first pin at one part of the line of pins, extends to a second pin at another part of the line of pins along a first direction of progression, spaced a plurality of pins in the first direction of progression from the first pin, adjacent to the last pin wrapped at the other part of the line to the side of the last pin that is in the first direction of progression, and extends back and fourth in sequence of pin to adjacent pin, taking an acute angle about each of the pins, forming a layer of string having a first internal diameter of an arc in the loop, so that a first dense layer of string is formed, a second length of string wrapped around a third pin at one part of the line of pins, extends to a fourth pin at another part of the line of pins along a second direction of progression, spaced a plurality of pins in the second direction of progression from the third pin, adjacent to the last pin wrapped in the second wrapping at the other part of the line to the side of the last pin that is in the second direction of progression, and extends back and fourth in sequence of pin to adjacent pin, taking an acute angle about each of the pins, forming a layer of string having a second internal diameter of an arc in the loop, so that a second dense layer of string is formed which extends over the first dense layer, exposing a portion of the first dense layer adjacent to an edge of the second dense layer forming a sculptured three dimensional shape with the first dense layer.

The pins are equally spaced on the line.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
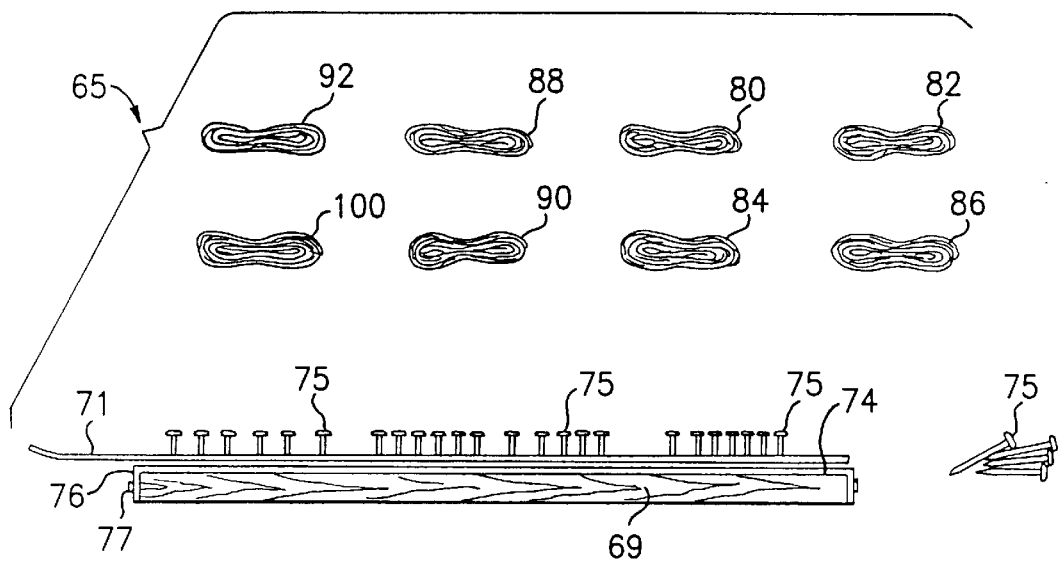
FIG. 1 is a side view of the invention.
Figure 4:
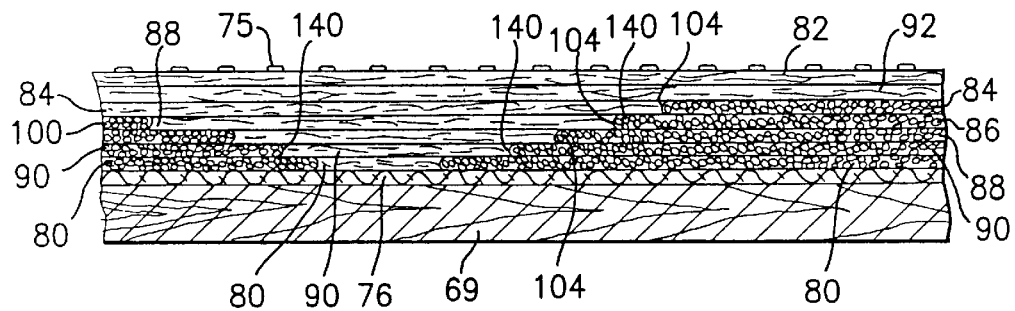
FIG. 4 is a schematic cross section view of a lobe of FIG. 3 viewed along 4—4.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIGS. 1–4, kit 65 of butterfly 98 includes wooden board 69, and thin paper sheet 71 which includes nail location dots 73. Each dot indicates where a nail 75 must be driven through sheet 71 into upper surface 74 of the board when the sheet is laid on the board.

The sheet is preferably removed after the nails are driven in, before string is wound on the nails.

Fabric 76 is mounted on board 69 by tacks 77. Other means for mounting may be used including adhesive. Fabric 76 may be burlap, velvet, cotton, plastic, or other material to provide a background other than can be provided by wood finish.

The board may be made from wood, plastic or other material that will take the nails, and may be used without fabric. A nice finish would then be preferred.

Figure 2A:
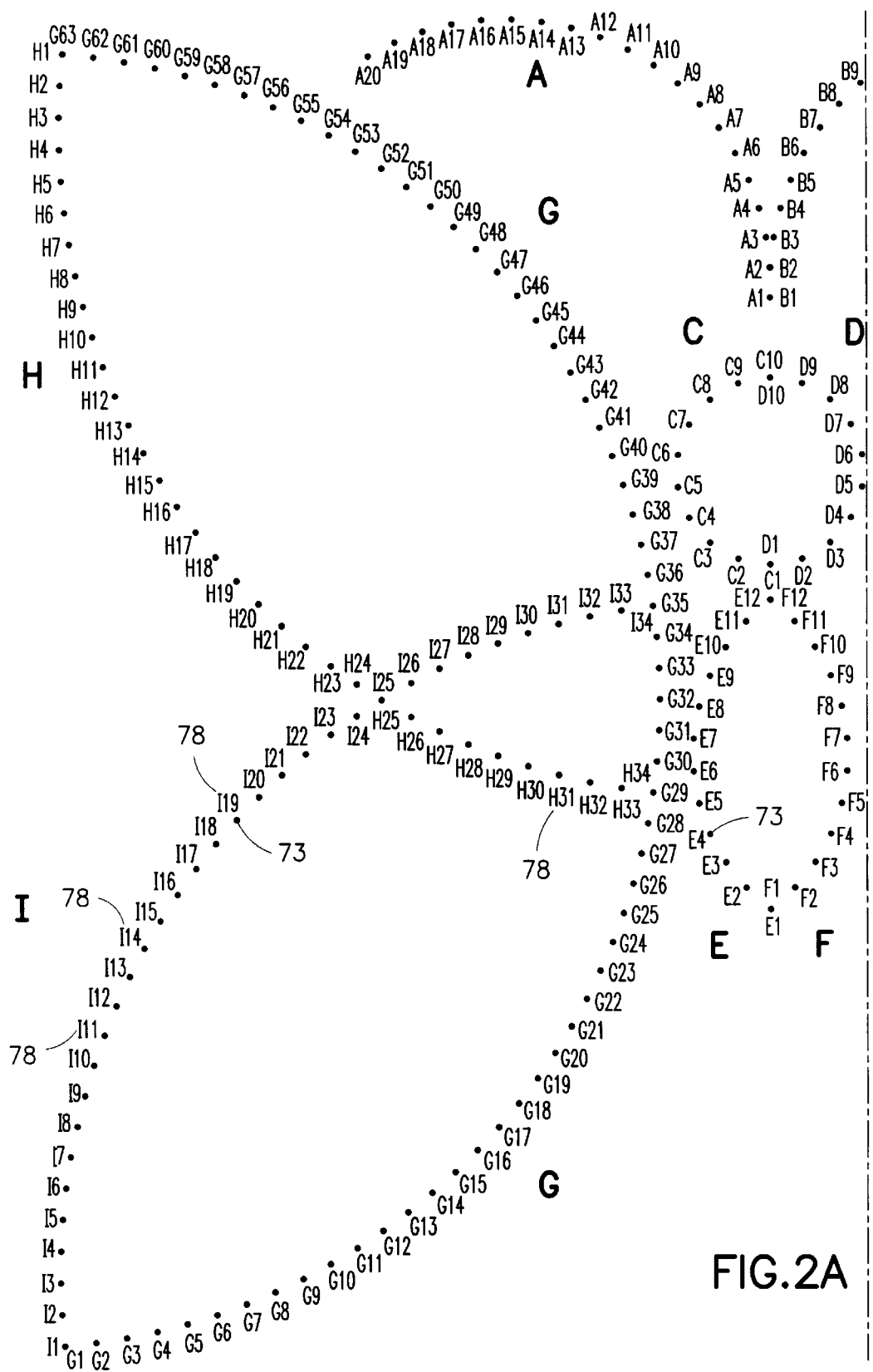
FIG. 2 is an instruction sheet showing numbered pin locations of a butterfly design.
Figure 3:
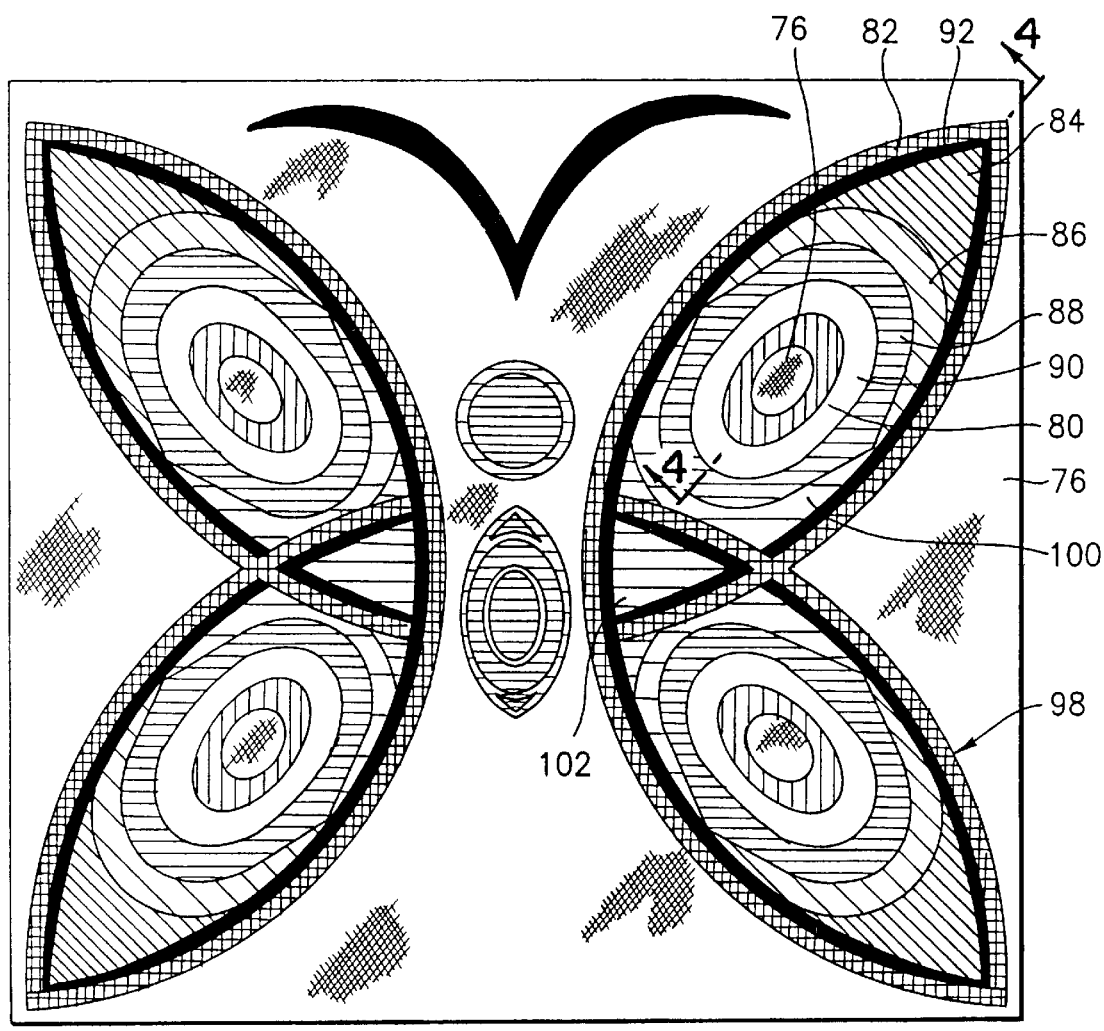
FIG. 3 is a schematic view of a three dimensional butterfly plaque of the invention.

Each nail location, illustrated in FIG. 2 as a dot, is marked with an identification number 78. Examples of identification numbers are H33, G27, F4, and J31.

The sheet that is nailed through may have only dots designating nail points. The sheet is preferably removed after the nails are in the board and before the wrap begins. As this sheet may be damaged or destroyed by removing it from the nailed board, separate reference sheet is provided with identification numbers.

The butterfly has a soft three-dimensional layered form with the transitional edges 104 of the layers having a bulbous feel, being raised in cross section.

Kit 65 also includes sheets like sheets 79, 81, 64, 66, 68, 70 and 72 and additional sheets which instruct where, how, and in what order and direction to wrap colored yarn around nails 75.

Packets of yarn in red 80, yellow, 82, green 84, light green 86, dark blue 88, white 90, black 92, light blue 100, and intermediate blue 102, are included in the kit for butterfly 98. Instruction sheets 79, 81, 64, 66, 68, 70 and 72 for making a different butterfly, butterfly 99, are shown in FIGS. 8–17.

Figure 5:
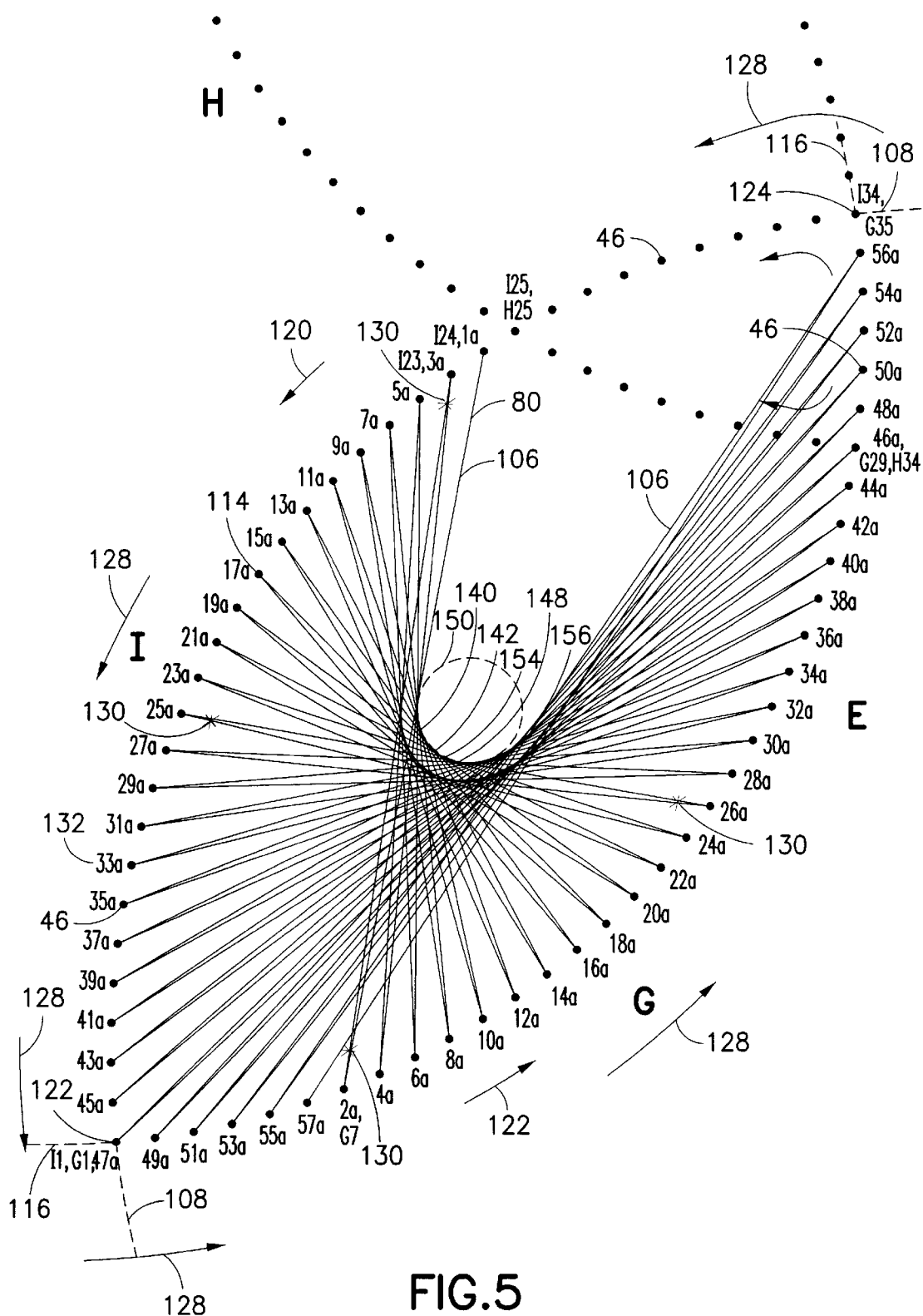
FIG. 5 is a diagrammatic view of partial stringing of the first layer of the lower left wing lobe of FIG. 2.
Figure 6:
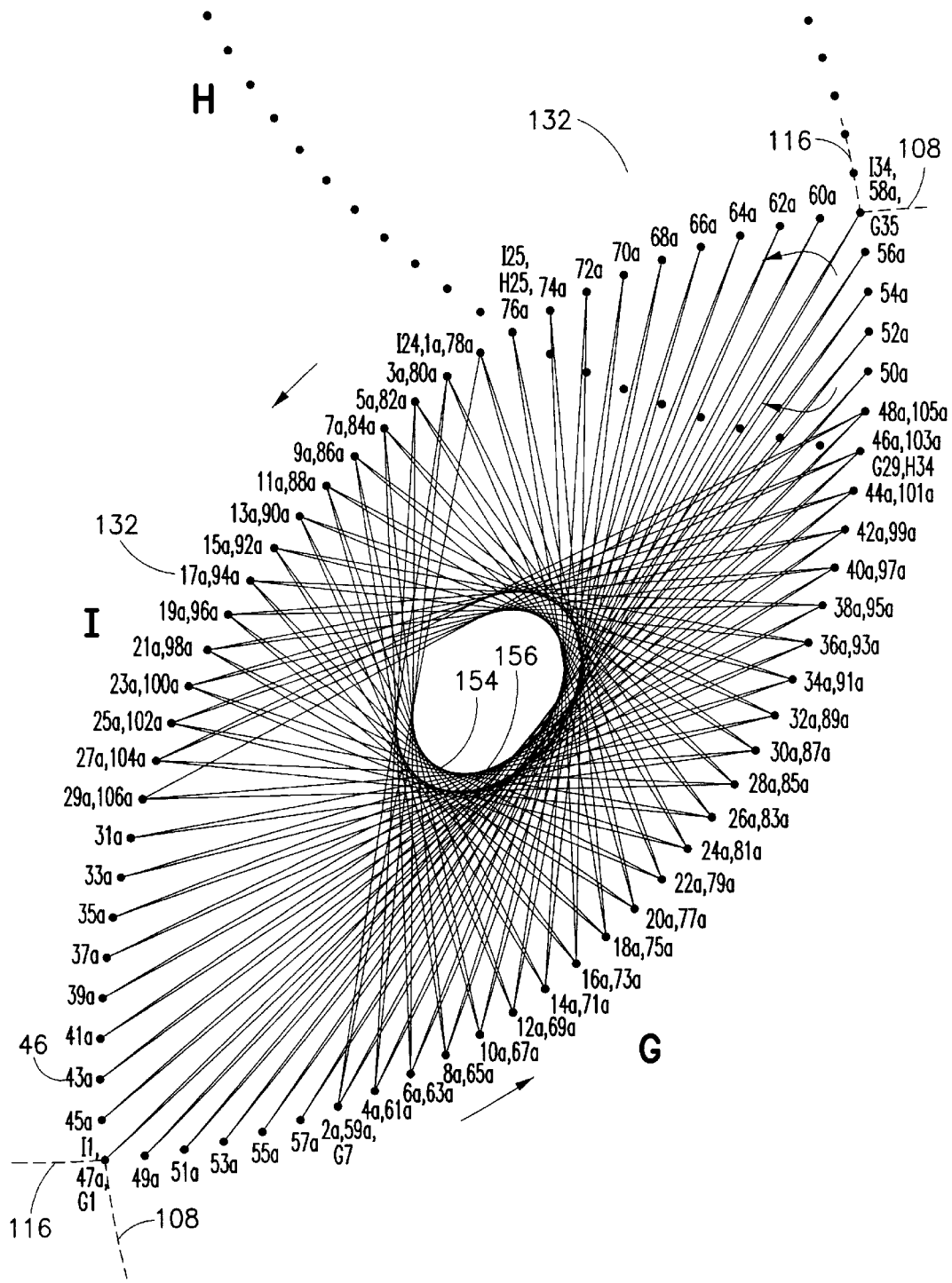
FIG. 6 is a diagrammatic view of partial stringing of the first layer of lower left wing lobe of FIG. 2.
Figure 7:
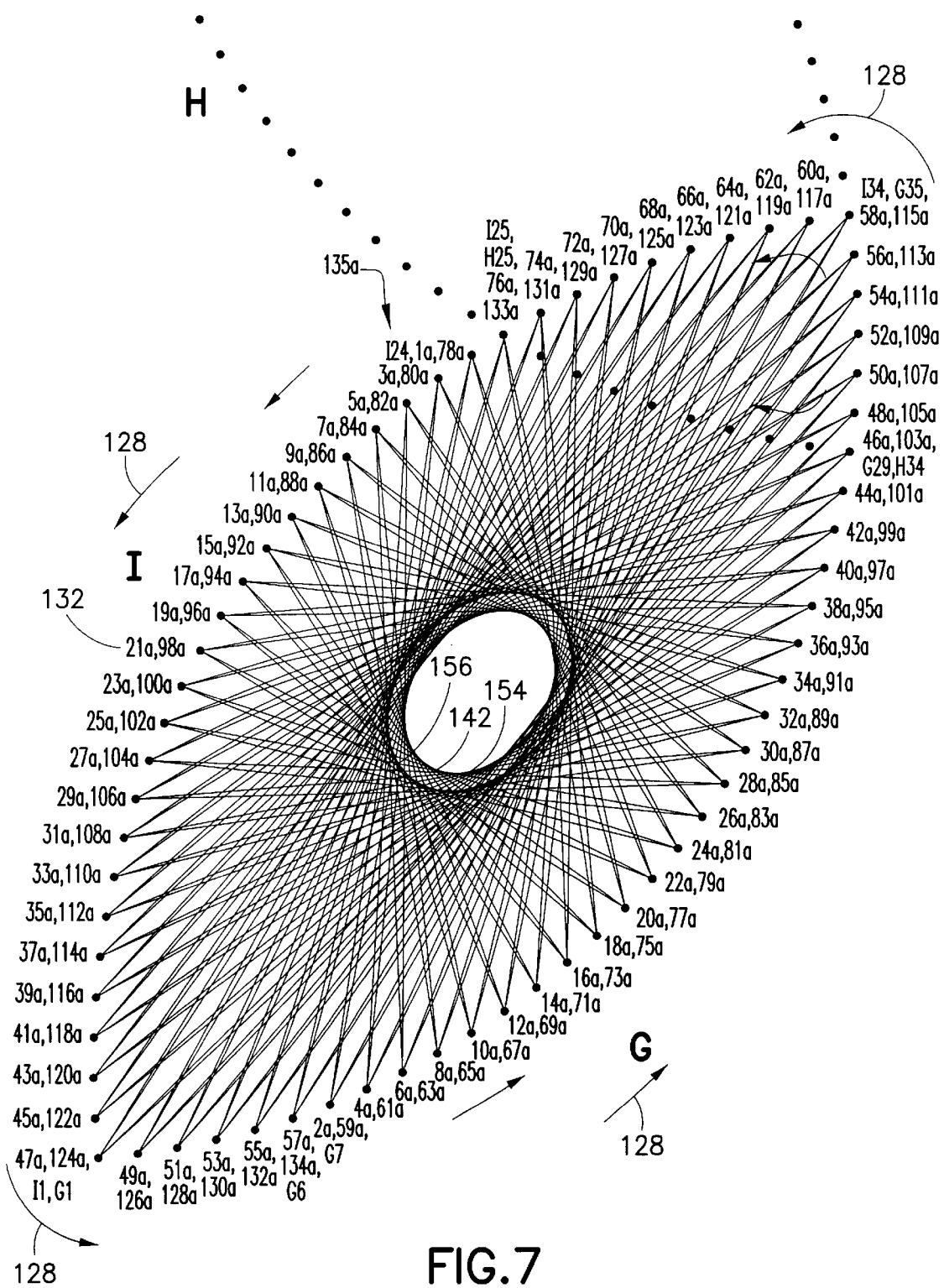
FIG. 7 is a diagrammatic view of completed stringing of the first layer of lower left wing lobe of FIG. 2.

Referring to FIG. 2 and to FIGS. 5–7, FIGS. 5–7 show steps in making a completely encircled wrap of the lower left lobe of butterfly 99.

Nail line 108 passes through nails 75. Nail line 116 passes through nails 75 and diverges from nail line 108 as the two lines extend from vertex 122 of left lower lobe 132 of butterfly 99 and from nail G1. Nail lines 108 and 116 also diverge from one another as they extend from vertex 128 of lobe 132 and from nail I34.

Preferably the nails in nail line 108 are spaced equal distances from each other and the nails in nail line 116 are spaced equal distances from one another, the same distance between nails as in line 108. Preferably an end of line 108 continues with an end of line 116 by nails spaced from one another as nails spaced within line 108. Preferably the nails count around to an even number.

Preferably the nails in four wings of the butterfly are the same distance between nails within each line of nails that forms the lobes of the wings, and where the lines forming the lobes cross each other. Each lobe of the wings is a loop. Preferably the loop is closed. Preferably opposite sides of the loop are symmetrical to each other.

Instructions for constructing the first, or lowermost, layer of the left lower lobe 132 of butterfly 99 includes tying one end of a continuous string 106 of red yarn 80 to nail I24 of nail line 108, extend the string in a straight line to nail G7 of nail line 116, wrapping the string around the nail and extending the string in a straight line to the next nail adjacent to nail I24 in direction 120.

The wrapping continues with the string being threaded in sequence of nail to adjacent nail in opposite directions 120, 126 on each line 108, 116, taking an acute angle 130 about each of the nails.

Opposite directions 120, 126 comprise a continuous circular direction of progression 128 around the lobe 132.

The steps, sequence, and direction of stringing is numbered ##a for convenience of the reader of this specification. By following numbers 1a, 2a, 3a, 4a, 5a, and so forth the reader can see the order and direction of progression of the wrapping steps.

On instruction sheets for users of the kit numbering by quadrant "E", "G" "C", etc. with a sequential number may be used. This numbering system is shown in FIG. 2, and is referred to in FIGS. 8–18.

A dense layer of the criss-crossed string is built in a dense, bulbous 140 band 142 adjacent to the circumference 148 of predetermined size loop 150. Loop 150 has a shape determined by the shape of lobe lines 108, 116.

Lobe lines 108 and 116 are fixed in geometrical space to one another. Loop 150 geometrical shape is fixed by the nails in the board.

Band 142 has an inner circumference 154 and an outer circumference 156. The inner circumference of band 142 is formed by string that passes through the outer circumference of band 142, crosses the band, and is tangent to circumference 148 of loop 150. The outer circumference of band 142 is formed by string that is tangent to the outer circumference of band 142 and does not pass through band 142.

String which forms inner circumference 154 extends from a nail in one line of lines 108 and 116, to another nail in the other of lines 108 and 106 adjacent to the last nail wrapped in the other of the lines and in the direction of progression 128 from the last nail wrapped in the other of the lines.

String which forms outer circumference 156 extends from a nail in one line of lines 108 and 116, to another nail in the other of lines 108 and 106 adjacent to the last nail wrapped in the other of the lines and in the direction opposite to the direction of progression 128 from the last nail wrapped in the other of the lines.

In terms of the direction of progression, string which forms inner circumference 154 extends from a first nail at one part of the line of nails 75 along direction of progression 128 that form the outer shape of lobe 132, say 13a, to a second nail 14a at another part of the line of nails 75 along direction of progression 128 spaced a plurality of nails in the direction of progression from the first nail, adjacent to the last nail 12a wrapped at the other part of the line to the side of the last nail 12a that is in the direction of progression 128.

In terms of the direction of progression, string which forms outer circumference 156 extends from a first nail at one part of the line of nails 75 along direction of progression 128 that form the outer shape of lobe 132, say 14a, to a second nail 15a at another part of the line of nails 75 adjacent to the last nail 13a wrapped in the other part of the line to the side of the last nail 13a that is in the direction of progression 128. direction opposite to the direction of progression 128 from the last nail wrapped in the other of the lines.

In FIG. 6, the wrapping has progressed to second wraps around some of the nails, including I23, but inner circumference 154 and outer circumference 156 are incomplete toward nail line 108.

In FIG. 7, band 142, and inner circumference 154 and outer circumference 156 are completely formed. Wrap of the nails circles in order of progression 128 from start nail I24 back to and past the same start nail, I24, and on around to wrap on nail G6 at wrap number 134a and to end at start nail I24 at number 135a. Every nail in nail lines 108 and 116 up to starting nail I24 is wrapped by two acute angle thread folds. Nail I24 has one acute angle wrap and an acute angle between two additional string attachments, one start connection string leading away to G7 and one end connection string coming back from G6.

Figure 8A:
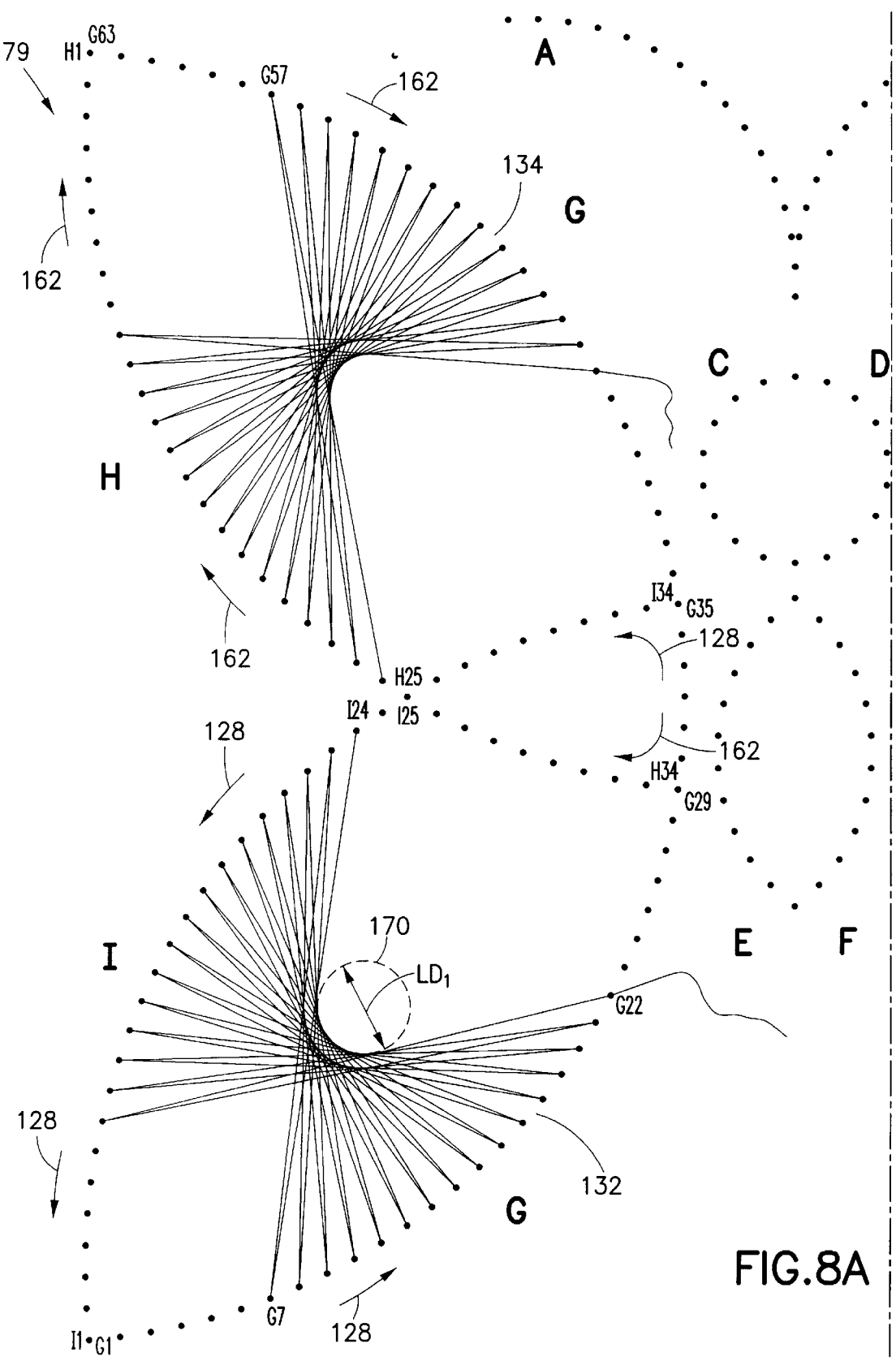
FIG. 8 is an instruction sheet showing partial stringing of the first layer of another three-dimensional butterfly of the invention.

In FIG. 8 instructions for making the first layer of butterfly 99 describe wrapping with light blue yarn. In each lobe, making a knot at the starting nail, and wrapping until a circle having a closed inner circumference with bulbous edge and closed outer circumference is formed. The wrap of pins as discussed earlier in with reference to FIGS. 5–7, circles around the lobe twice so that each nail up to the starting nail has at least two acute angle wraps. Preferably the starting nail has two acute angle string contacts.

In the FIG. 8 construction the instructions for complete stringing of the layer provided with sheet 79 of partial stringing include:

pin type=makes its own hole in the board, preferably flat head nail
string color=blue string type=yarn String starting from the "tie to" pin, around the lobe in the continuous circular direction of progression until a loop band is formed having the appearance of being closed, that is, full circle, with continuous inner and outer circumference.

Preferably string around the lobe past the starting "tie to" pin and end by stringing back to the "tie to" pin from an acute angle wrap around the pin before and adjacent to the "go to" pin taken from the continuous circular direction of progression, and tie off on the "tie to" pin.

TABLE 1

FIG. 8

Start:

| lobe | tie to pin | go to and wrap around | direction of progression | last 2nd acute angle wrap preferably |
|---|---|---|---|---|
| top left 134 | H25 | G57 | 162 | G58 |
| top right 138 | K25 | J57 | 164 | J58 |
| bottom left 132 | I24 | G7 | 128 | G6 |
| bottom right 136 | L24 | J7 | 166 | J6 |

162 and 166 are clockwise (cw)
164 and 128 are counterclockwise (ccw)

In complete circle wrap, the tie-off of the string can be at the start pin. But to avoid having two knots, the starting knot of the string, and the tie-off end knot of the string, on the same pin, the tie off can be on the "go to and wrap around pin", in which case the last 2nd acute angle wrap will be around the start "tie to" pin.

This instruction provides in the bottom left lobe, a blue background of radial colored string appearing to emanate from a loop shaped band having a continuous outer circumference, and a continuous inner circumference 170, and extending to the circumference of the lobe. The inner circumference having a loop diameter LD1. This lower left lobe first layer is like the lower left lobe first layer stringing of FIGS. 5–7 which have the same start and go to locations.

For more advanced kit builders, the instruction means may be only a numbered sheet like FIG. 2, and written directions like those above.

Figure 9A:
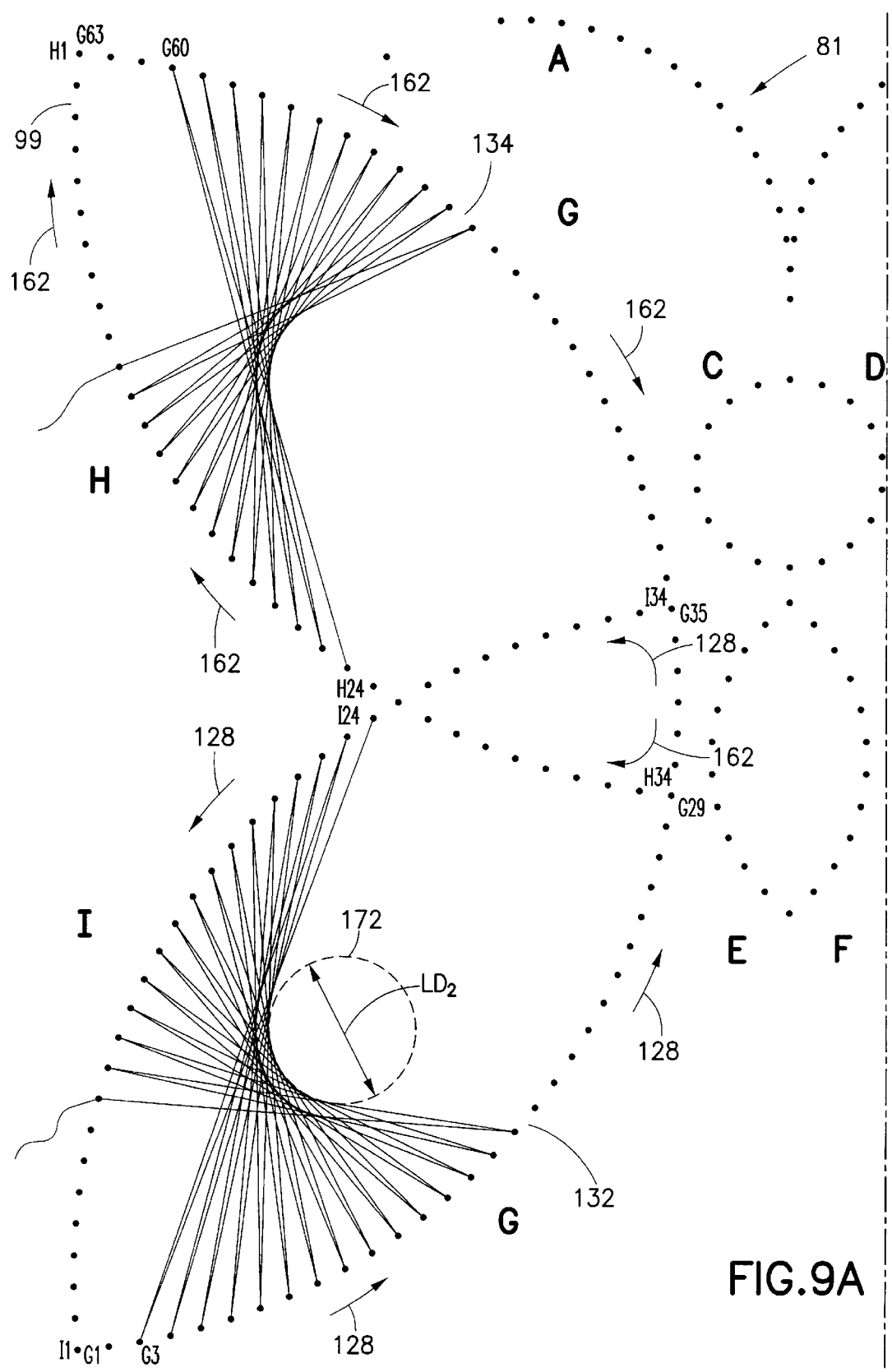
FIG. 9 is an instruction sheet showing partial stringing of the second layer of the butterfly of FIG. 8.
Figure 9B:
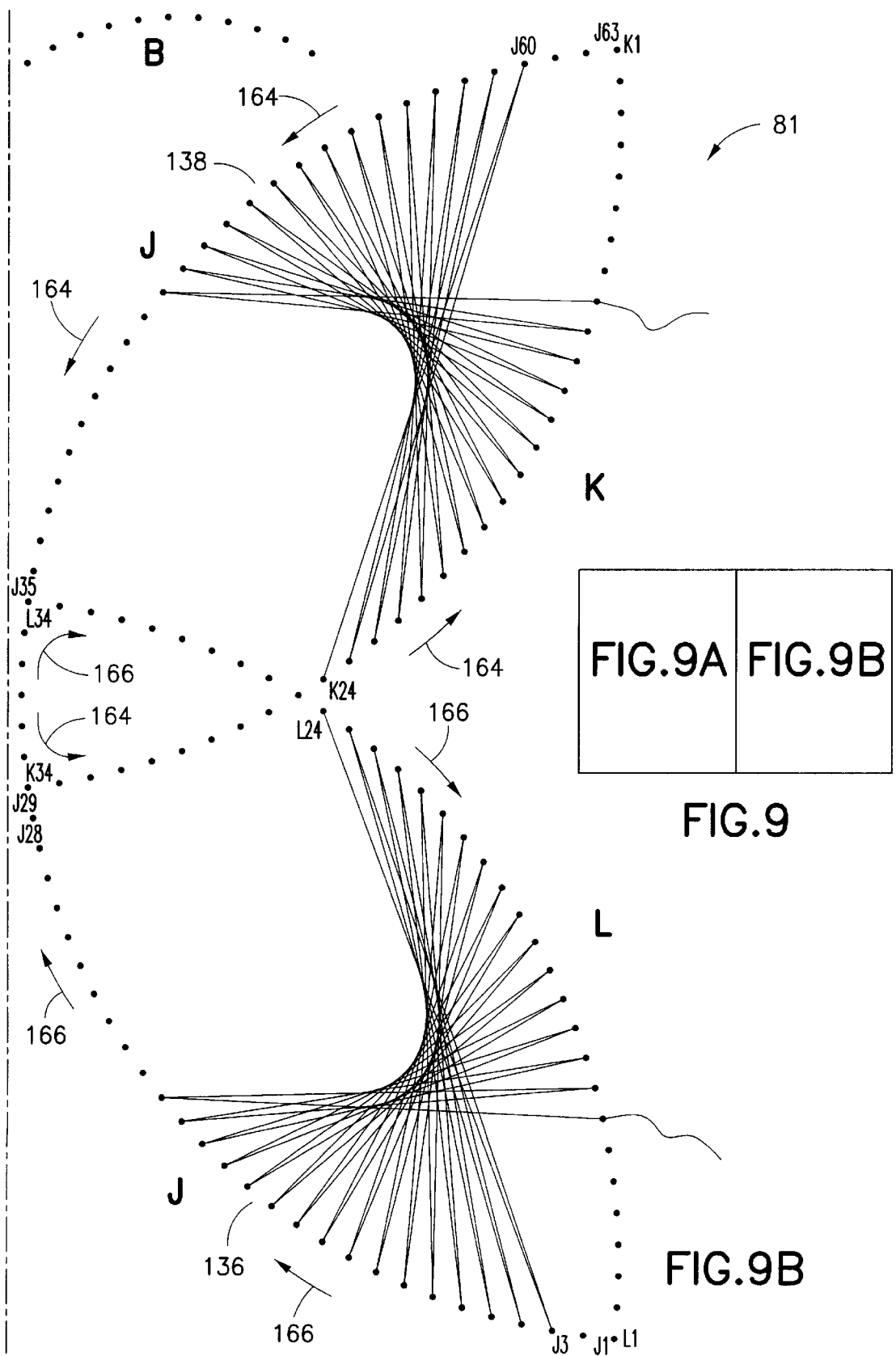

In the FIG. 9 construction the instructions for complete stringing of the layer provided with sheet 81 of partial stringing include:
string color=purple string type=yarn String, starting from the "tie to" pin, around the lobe in the continuous circular direction of progression until a loop band is formed having the appearance of being closed with continuous inner and outer circumference.

Preferably string around the lobe past the starting "tie to" pin and end by stringing back to the "tie to" pin from an acute angle wrap around the pin before and adjacent to the "go to" pin taken from the continuous circular direction of progression, and tie off on the "tie to" pin.

TABLE 2

FIG. 9

Start:

| lobe | tie to pin | go to and wrap around | direction of progression | last 2nd acute angle wrap preferably |
|---|---|---|---|---|
| top left 134 | H24 | G60 | 162 | G61 |
| top right 138 | K24 | J60 | 164 | J61 |
| bottom left 132 | I24 | G3 | 128 | G2 |
| bottom right 136 | L24 | J3 | 166 | J2 |

This instruction provides in the bottom left lobe, a purple layer of radial colored string appearing to emanate from a loop shaped band having a continuous outer circumference, and a continuous inner circumference 172, and extending to the circumference of the lobe. The inner circumference having a loop diameter LD2.

Diameter LD2 is larger than diameter LD1.

This permits a portion of the blue band of diameter LD1 to show within the diameter of the purple band of diameter LD2. The rest of the blue background is covered by the purple layer. The adjacent inner diameters provide a three-dimensional look and feel within the lobe.

In FIGS. 10–17, just the left side of the butterfly is shown. The right side of the butterfly is symmetrical with the left side.

Figure 10:
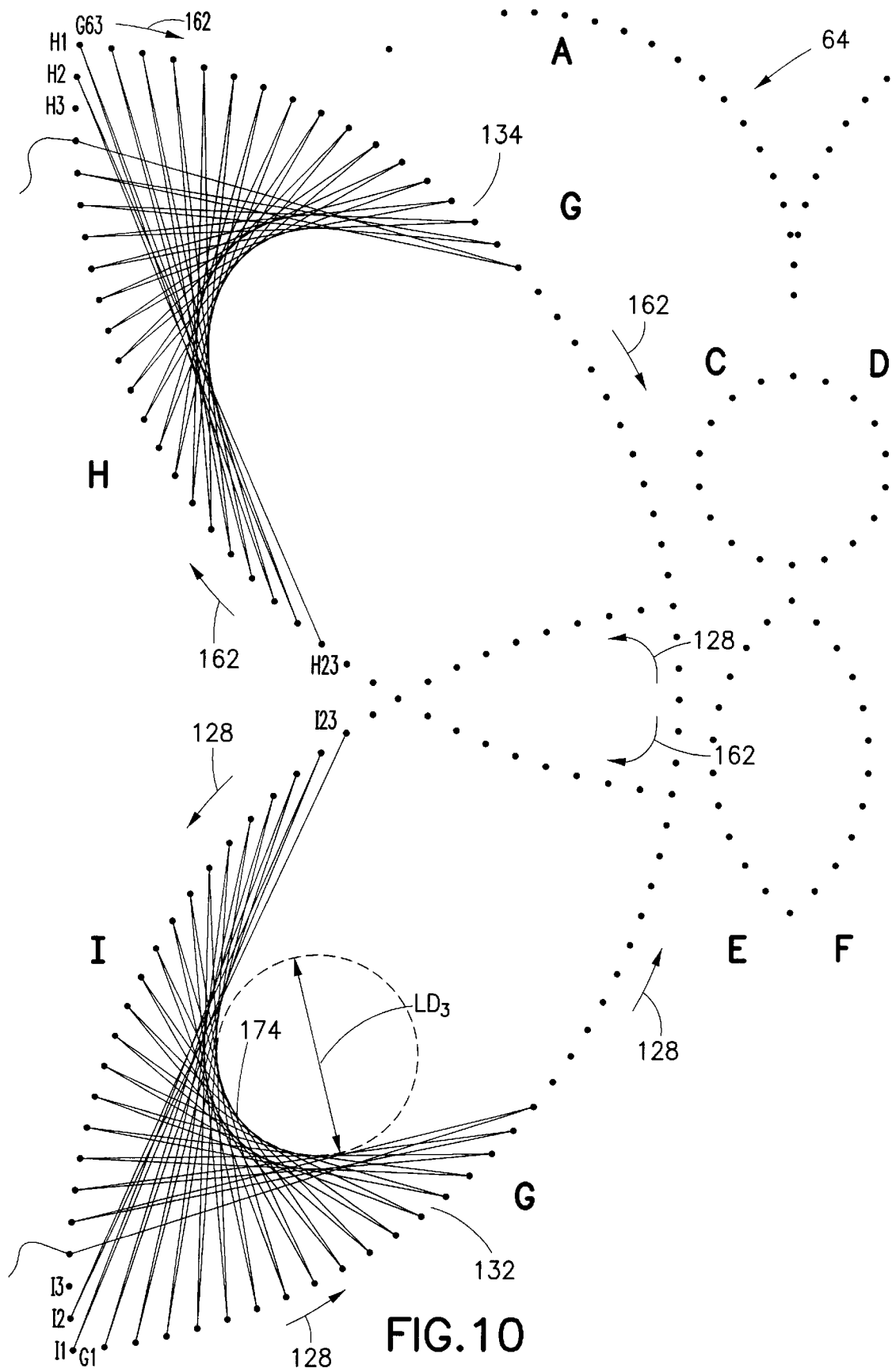
FIG. 10 is an instruction sheet showing partial stringing of the third layer of the left side of the butterfly of FIG. 8.

In the FIG. 10 construction the instructions provided for complete stringing of the layer with sheet 64 of partial stringing of the left side include:
string color=black string type=yarn String, starting from the "tie to" pin, around the lobe in the continuous circular direction of progression until a loop band is formed having the appearance of being closed with continuous inner and outer circumference, that is, full circle.

Preferably string around the lobe past the starting "tie to" pin and end by stringing back to the "tie to" pin from an acute angle around the pin before and adjacent to the "go to" pin taken from the continuous circular direction of progression, and tie off on the "tie to" pin.

TABLE 3

FIG. 10

Start:

| lobe | tie to pin | go to and wrap around | direction of progression | last 2nd acute angle wrap preferably |
|---|---|---|---|---|
| top left 134 | H23 | H2 | 162 | H3 |
| top right | K23 | K2 | (ccw) | K3 |
| bottom left 132 | I23 | I2 | 128 | I3 |
| bottom right | L23 | L2 | (cw) | L3 |

This instruction provides in the bottom left lobe, a black layer of radial colored string appearing to emanate from a loop shaped band having a continuous outer circumference, and a continuous inner circumference 174, and extending to the circumference of the lobe. The inner circumference having a loop diameter LD3.

Diameter LD3 is larger than diameter LD2.

This permits a portion of the blue band of diameter LD1 and purple band of diameter LD2 to show within the diameter of the black band of diameter LD3. The adjacent inner diameters provide a three-dimensional look and feel within the lobe.

Figure 11:
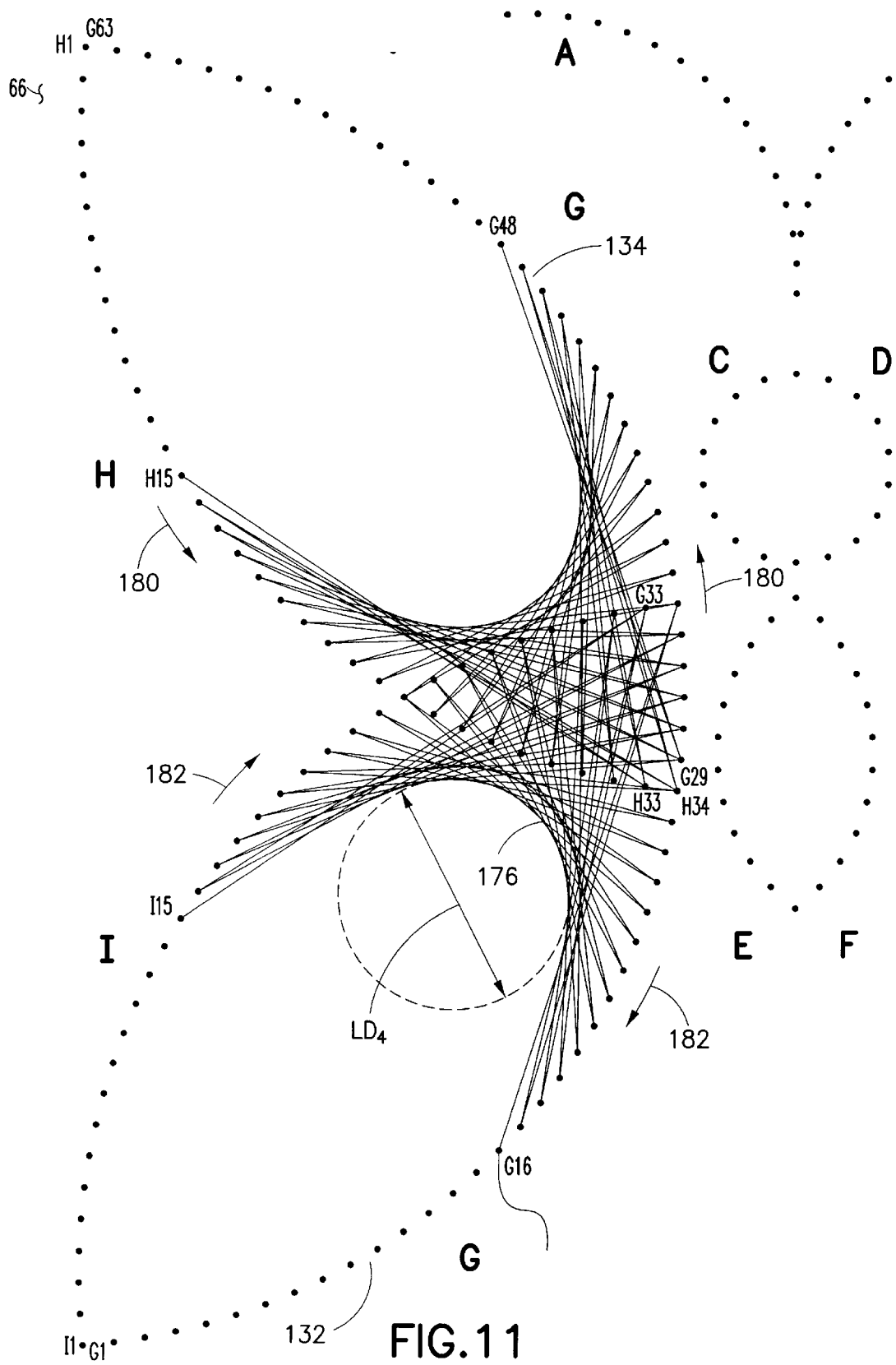
FIG. 11 is an instruction sheet showing complete stringing of the fourth layer of the left side of the butterfly of FIG. 8.

In the FIG. 11 construction the instructions for stringing of the fourth layer of the left and right side of the butterfly provided with sheet 66 showing complete stringing of the left side of the butterfly are:
string color=red string type=yarn String around the lobe in the continuous circular direction of progression only where shown.

Preferably string around the lobe from the "tie to" pin and end with a leg from the last acute angle wrap by tie off on the "end pin".

TABLE 4

FIG. 11

Start:

| lobe | tie to pin | go to and wrap around | direction of progression | end pin |
|---|---|---|---|---|
| top left 134 | H15 | H33 | 180 (cw) | G48 |
| top right | K15 | K33 |  | J48 |

TABLE 4-continued

FIG. 11

Start:

| lobe | tie to pin | go to and wrap around | direction of progression | end pin |
|---|---|---|---|---|
| bottom left 132 | I15 | G33 | 182 (ccw) | G16 |
| bottom right | L15 | L33 |  | J16 |

This instruction provides in the bottom left lobe, a red layer of radial colored string appearing to emanate from inner circumference arc 176 having a loop diameter LD4.

Diameter LD4 is larger than diameter LD3.

This permits portions of the blue band of diameter LD1, the purple band of diameter LD2, and the black band of diameter LD3 to show within the diameter of the red band of diameter LD4. The adjacent inner diameters provide a three-dimensional look and feel within the lobe.

Figure 12:
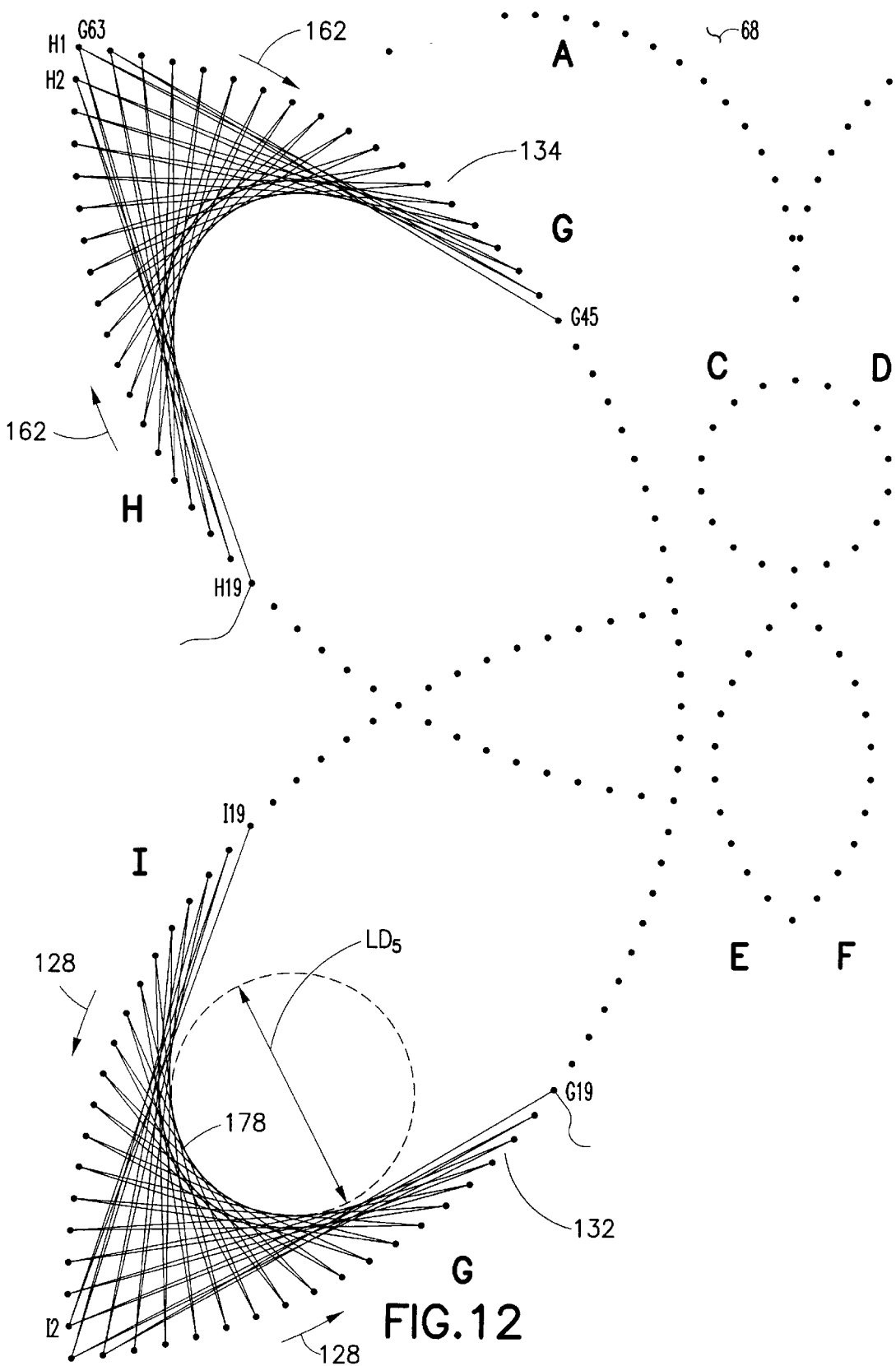
FIG. 12 is an instruction sheet showing complete stringing of the fifth layer of the left side of the butterfly of FIG. 8.

In the FIG. 12 construction the instructions for complete stringing of the fifth layer of the butterfly provided with sheet 68 showing the left side are:
string color=dark brown string type=yarn String around the lobe in the continuous circular direction of progression only where shown.

Preferably string around the lobe from the "tie to" pin and end with a leg from the last acute angle wrap by tie off on the "end pin".

TABLE 5

FIG. 12

Start:

| lobe | tie to pin | go to and wrap around | direction of progression | end pin |
|---|---|---|---|---|
| top left 134 | H19 | H2 | 162 | G45 |
| top right | K19 | K2 | (ccw) | J45 |
| bottom left 132 | I19 | I2 | 128 | G19 |
| bottom right | L19 | L2 | (cw) | J19 |

This instruction provides in the bottom left lobe, a dark brown layer of radial colored string appearing to emanate from inner circumference arc 178 having a loop diameter LD5.

Diameter LD5 is larger than diameter LD3, and the same size as diameter LD4.

This permits portions of the blue band of diameter LD1, the purple band of diameter LD2, and the black band of diameter LD3 to show within the diameter of the dark brown band of diameter LD5. The adjacent inner diameters provide a three-dimensional look and feel within the lobe.

Figure 13:
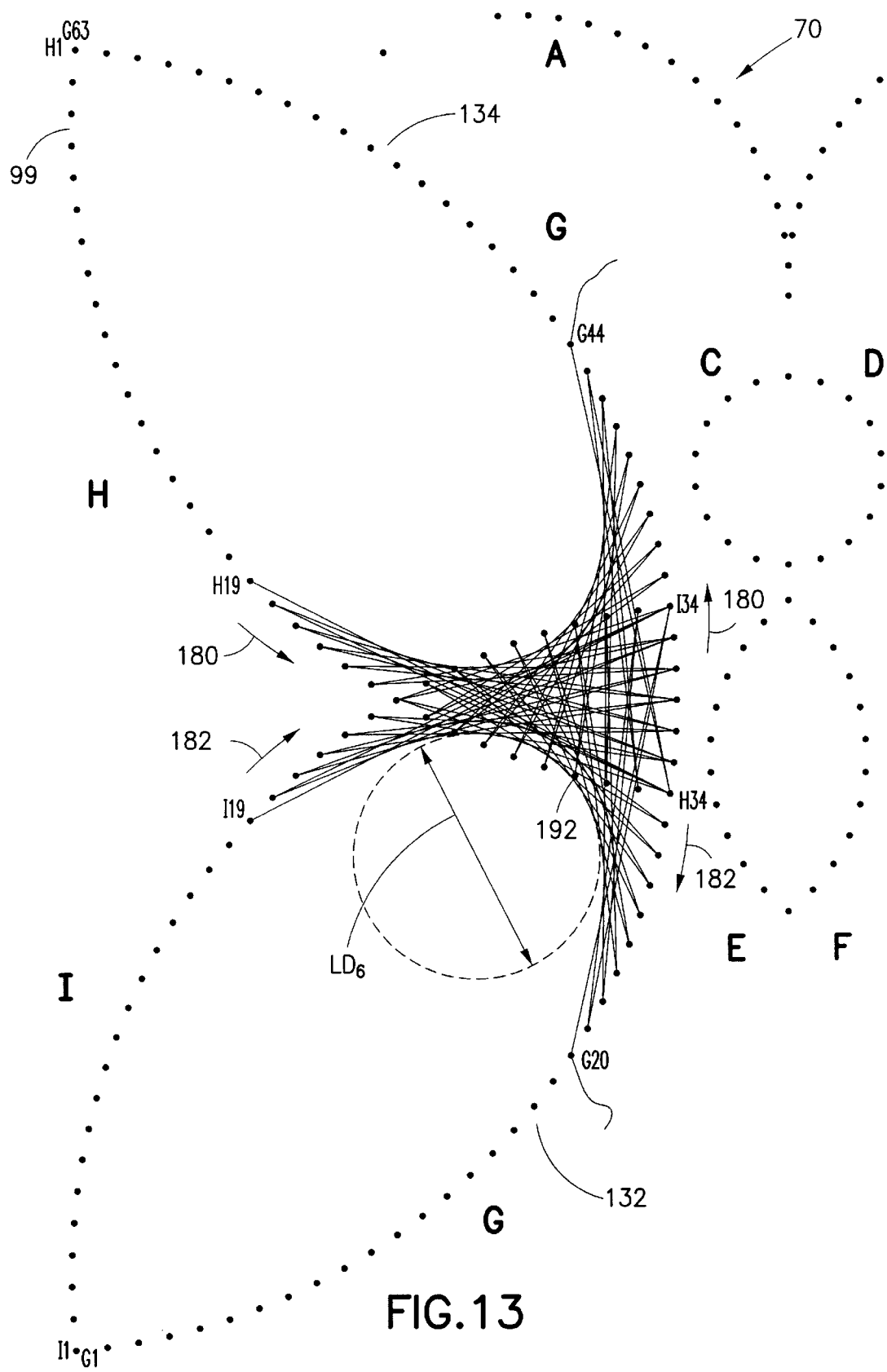
FIG. 13 is an instruction sheet showing complete stringing of the sixth layer of the left side of the butterfly of FIG. 8.

In the FIG. 13 construction the instructions for complete stringing of the sixth layer of the butterfly provided with sheet 70 showing the left side include:
string color=dark brown string type=yarn String around the lobe in the continuous circular direction of progression only where shown.

Preferably string around the lobe from the "tie to" pin and end with a leg from the last acute angle wrap by tie off on the "end pin".

TABLE 6

FIG. 13

Start:

| lobe | tie to pin | go to and wrap around | direction of progression | end pin |
|---|---|---|---|---|
| top left 134 | H19 | H34 | 180 | J44 |
| top right | K19 | K34 | (cw) | G44 |
| bottom left 132 | I19 | 134 | 182 | G20 |
| bottom right | L19 | L34 | (ccw) | J20 |

This instruction provides in the bottom left lobe, a dark brown layer of radial colored string appearing to emanate from inner circumference arc 192 having a loop diameter LD6.

Diameter LD6 is larger than diameters LD3, and LD4.

This permits portions of the blue band of diameter LD1, the purple band of diameter LD2, the black band of LD3, and the red band of diameter LD4 to show within the diameter of the dark brown band of diameter LD6. The adjacent inner diameters provide a three-dimensional look and feel within the lobe.

Figure 14:
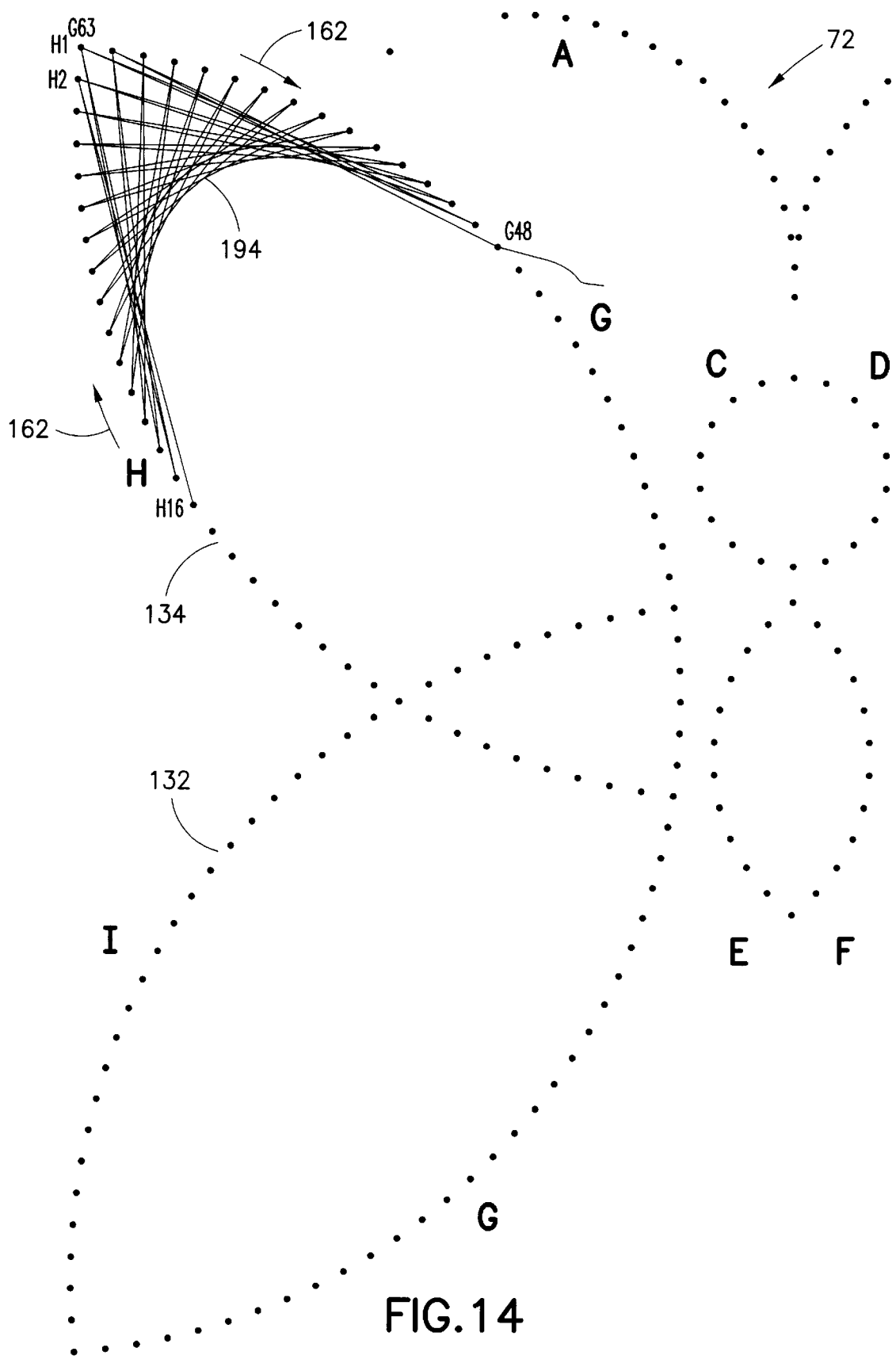
FIG. 14 is an instruction sheet showing complete stringing of the seventh layer of the left side of the butterfly of FIG. 8.

In the FIG. 14 construction the instructions for complete stringing of the seventh layer of the butterfly provided with sheet 72 showing the left side include:

string color=beige string type=yarn

String around the lobe in the continuous circular direction of progression only where shown.

Preferably string around the lobe from the "tie to" pin and end with a leg from the last acute angle wrap by tie off on the "end pin".

TABLE 7

FIG. 14

Start:

| lobe | tie to pin | go to and wrap around | direction of progression | end pin |
|---|---|---|---|---|
| top left 134 | H16 | H2 | 162 | G48 |
| top right | K16 | K2 | (CCW) | J48 |
| bottom left 132 | NA | NA | NA | NA |
| bottom right | NA | NA | NA | NA |

This instruction provides in the upper left lobe, a dark brown layer of radial colored string appearing to emanate from inner circumference arc 194 having a loop diameter LD7.

This permits portions of the blue band, the purple band, and the black bands below to show within the circumference of the dark brown layer arc 194. The adjacent inner diameters provide a three-dimensional look and feel within the lobe.

By comparing the direction of progression of the same lobe for the stringing on sheets 79, 81, 64, 66, 68 and 70, you can see that a string layer can have a different direction of progression from the angle of progression of the string layer that it covers.

TABLE 8

Direction of Progression  cw = clockwise  ccw = counterclockwise

| lobe sheet | 134 | | 132 | | 138 | | 136 | |
|---|---|---|---|---|---|---|---|---|
| 79 | 162, | cw | 128, | ccw | 164, | ccw | 166, | cw |
| 81 | 162, | cw | 128, | ccw | 164, | ccw | 166, | cw |
| 64 | 162, | cw | 128, | ccw | | ccw | | cw |
| 66 | 180, | ccw | 182, | cw | | cw | | ccw |
| 68 | 162, | cw | 128, | ccw | | ccw | | cw |
| 70 | 180, | ccw | 182, | cw | | cw | | ccw |
| 72 | 162, | cw | NA | | | ccw | NA | |

Given the same starting pin of an upper layer having continuous, complete LD that is concentric with the continuous, complete, smaller LD of a layer below, the number of pins from the starting tie to pin to the first wrap pin counted in the direction of progression in the upper layer is smaller than it is for the layer below.

TABLE 9

| Sheet | Diameter | longest string length | inner circumference |
|---|---|---|---|
| 79 | LD1 | 29 nails | 170 |
| 81 | LD2 | 25 nails | 172 |

Various materials may be used for the string as long as it can be wrapped. Colored yarn, flexible wire, and flexible woven fiberglass can be used.

Nails, self tapping screws, wood screws, stick pins and other pins which can make their own holes in the board may be used.

Preferably the pin is stiff and is larger at the free end to prevent slippage of the string off the free end when the pin is in the board.

Figure 15:
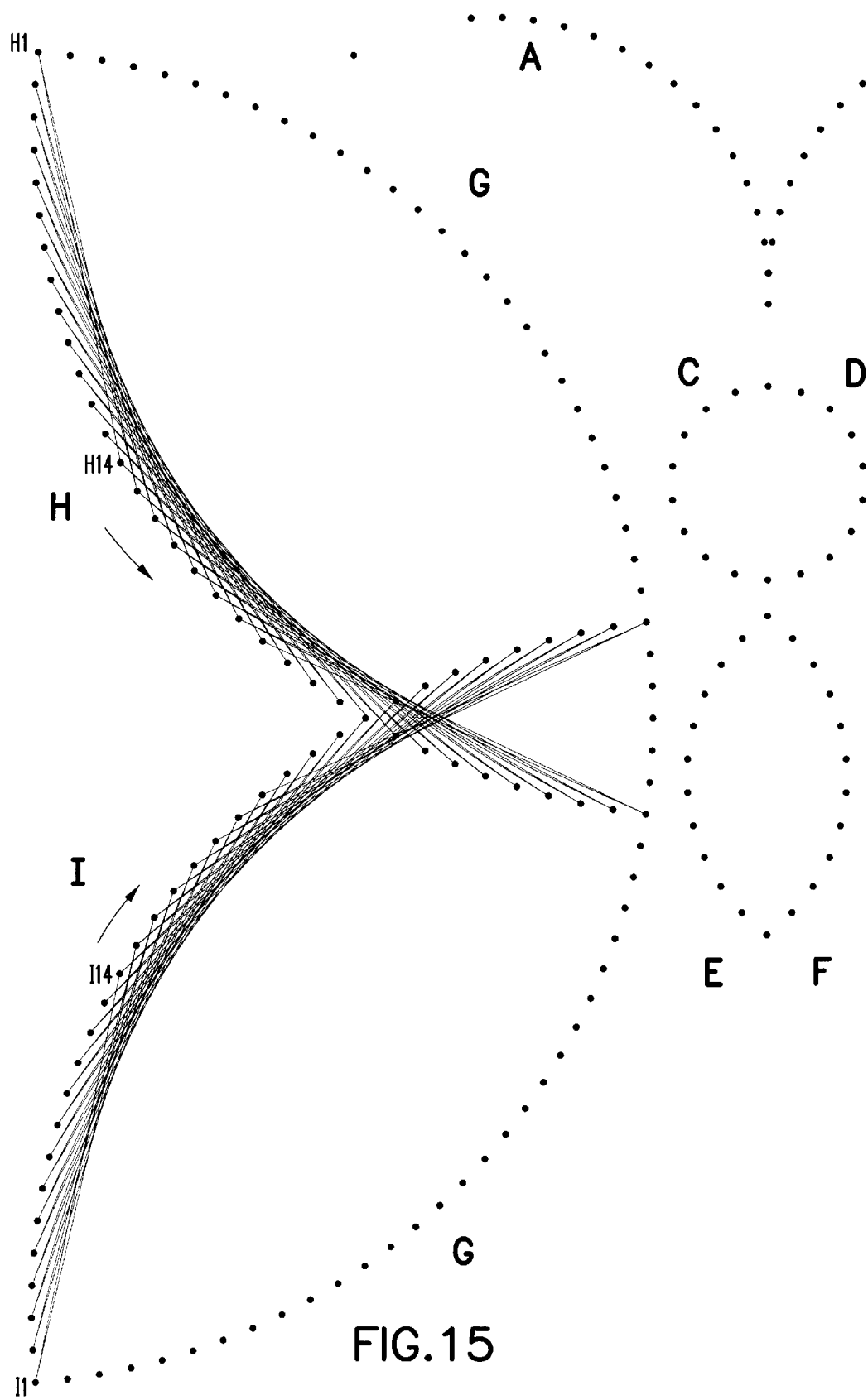
FIG. 15 is an instruction sheet showing partial stringing of the eighth layer, trim, of the left side of the butterfly of FIG. 8.

In FIG. 15, outer trim is applied. The construction instructions provided include:

String color=dark brown string type=yarn

String around the outer side of the lobe in the continuous circular direction of progression.

TABLE 10

FIG. 15

Start:

| lobe | tie to pin | go to and wrap around | direction of progression | | end pin |
|---|---|---|---|---|---|
| top left 134 | H14 | H1 | 180 | (ccw) | H14 |
| top right | K14 | K1 | | (cw) | K14 |
| bottom left 132 | I14 | I1 | 182 | (cw) | O14 |
| bottom right | L14 | L1 | | (ccw) | L1 |

Figure 16:
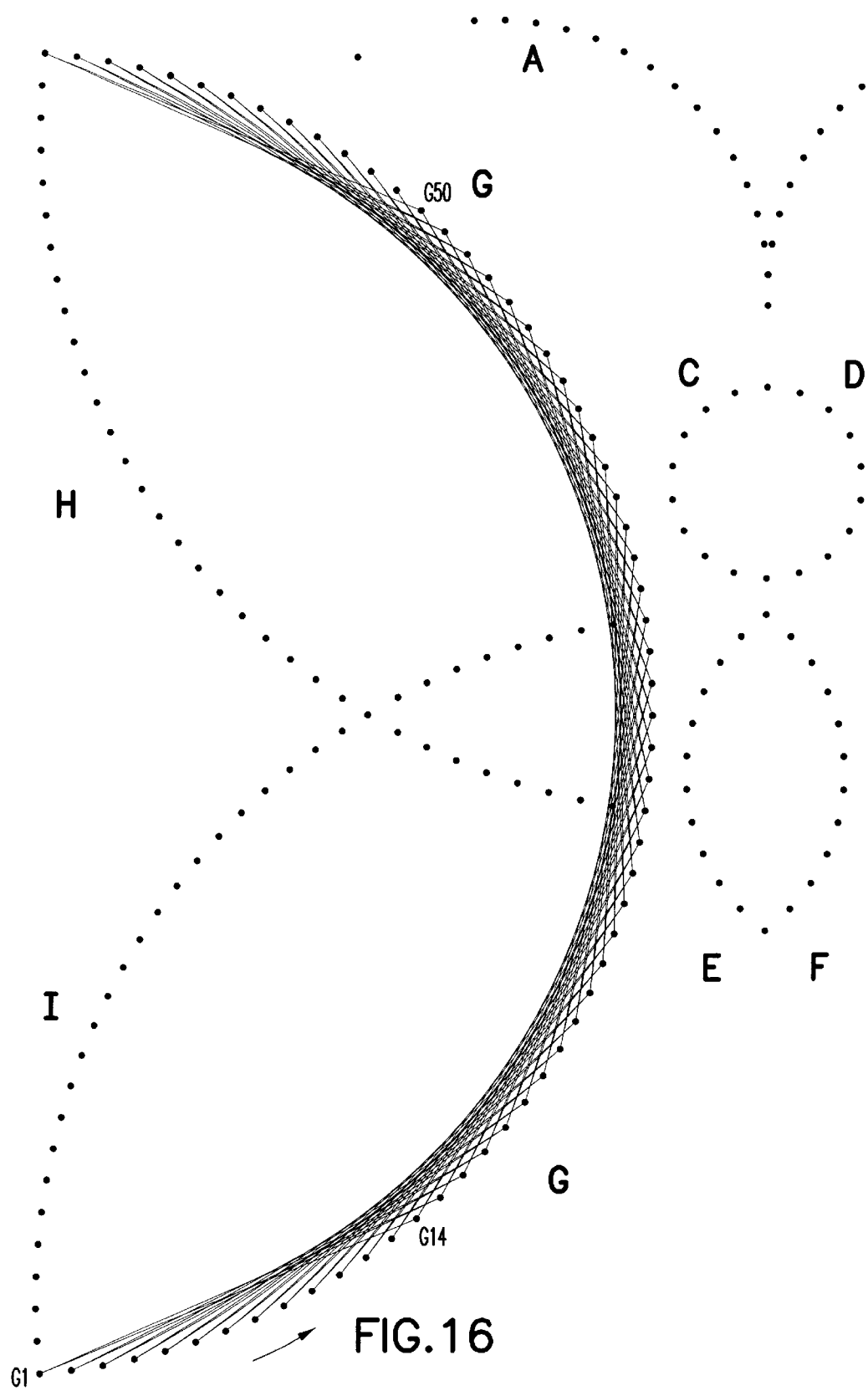
FIG. 16 is an instruction sheet showing partial stringing of the eighth layer, trim, of the left side of the butterfly of FIG. 8.

In FIG. 16, inner trim is applied. The construction instructions provided include:

String color=dark brown string type=yarn

String around the inner sides of the combined upper and lower lobes in the continuous circular direction of progression.

TABLE 11

FIG. 16

Start:

| lobe | tie to pin | go to and wrap around | direction of progression | end pin |
|---|---|---|---|---|
| left | G14 | G1 | (ccw) | G14 |
| right | J14 | J1 | (cw) | J1– |

Figure 17:
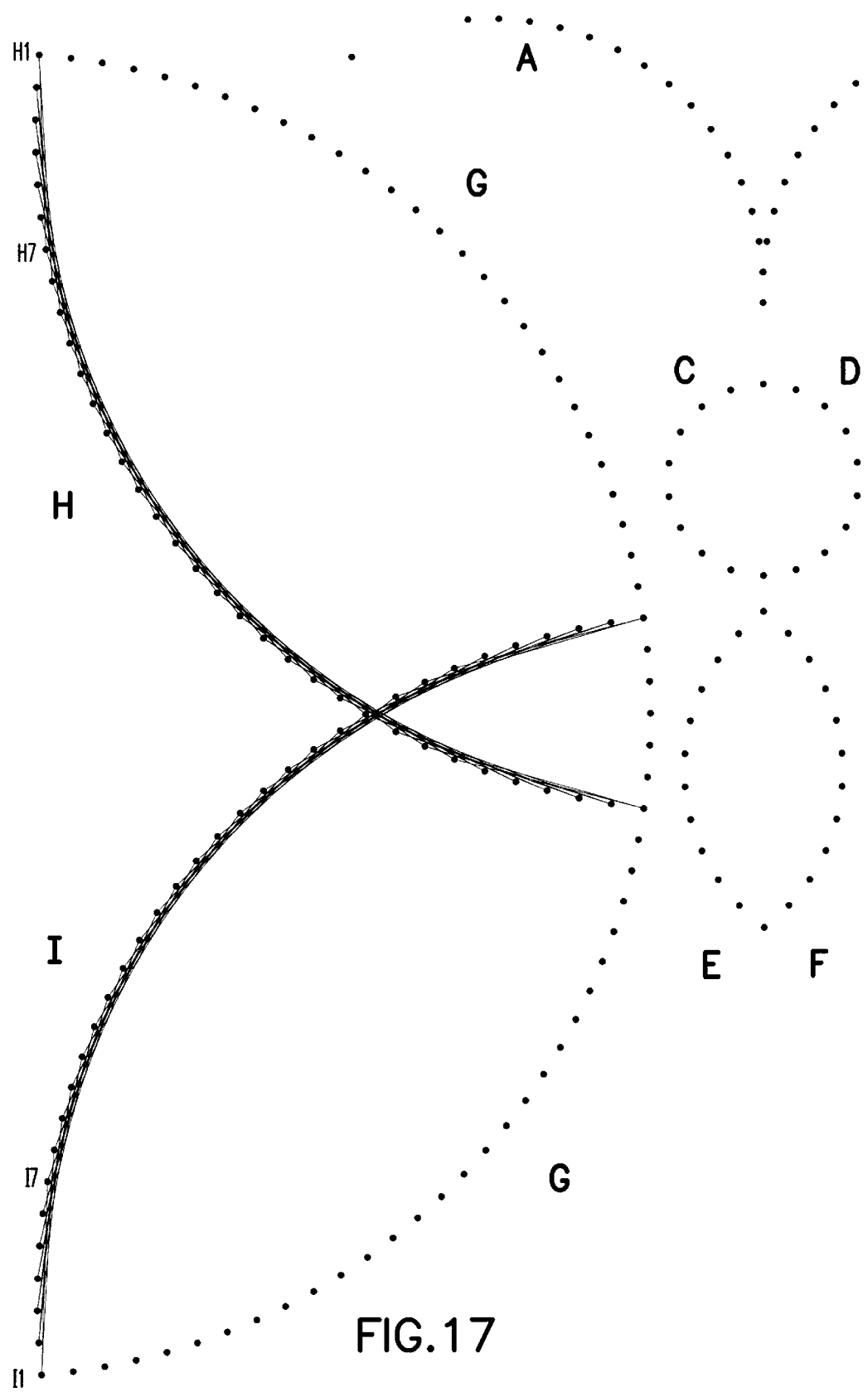
FIG. 17 is an instruction sheet showing complete stringing of the ninth layer, trim, of the left side of the butterfly of FIG. 8.

In FIG. 17, another layer of trim is applied over the layer of FIG. 15. The construction instructions provided include:
String color=beige string type=yarn String around the outer side of the lobe in the continuous circular direction of progression.

TABLE 12

FIG. 17

Start:

| lobe | tie to pin | go to and wrap around | direction of progression | end pin |
|---|---|---|---|---|
| top left 134 | H7 | H1 | 180 (ccw) | H7 |
| top right | K7 | K1 | (cw) | K7 |
| bottom left 132 | I7 | I1 | 182 (cw) | I1 |
| bottom right | L7 | L1 | (ccw) | L1 |

Tables 13, 14, and 15 instruct wrapping for the body, head and antenna of the butterfly.

Figure 18:
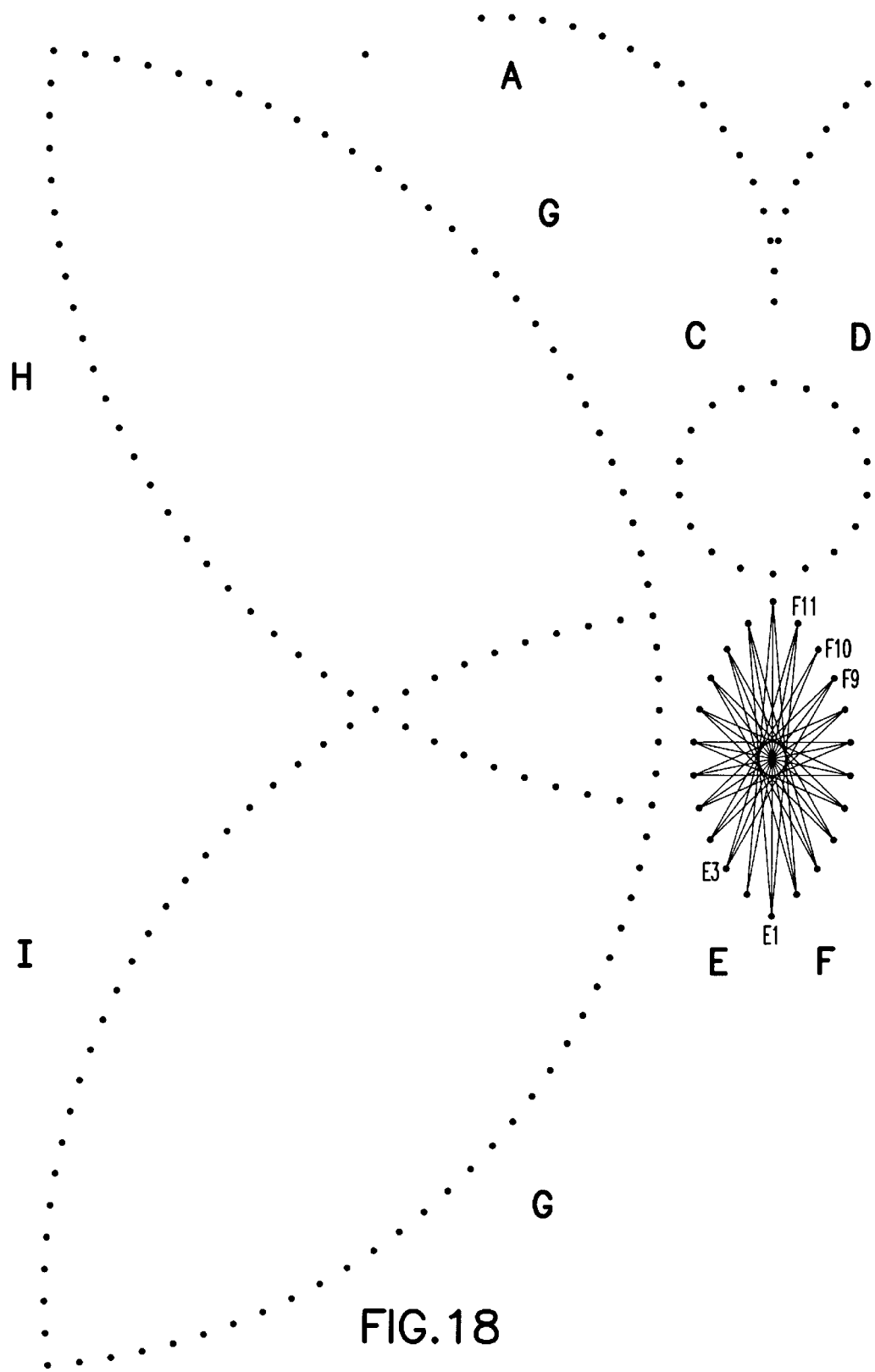
FIG. 18 is an instruction sheet showing stringing of the first layer of the body of the butterfly.
Figure 19:
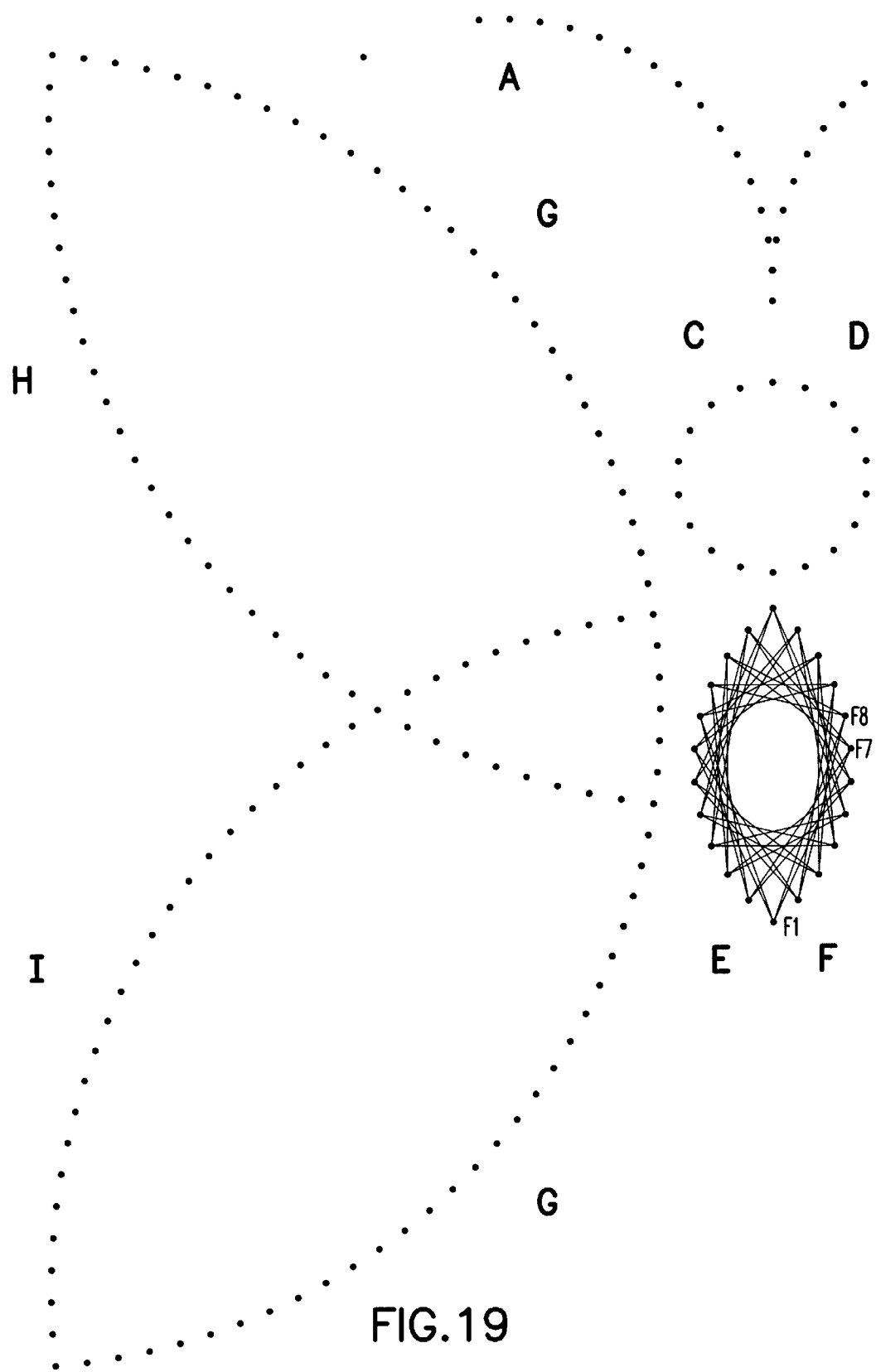
FIG. 19 is an instruction sheet showing complete stringing of the second layer of the body.
Figure 20:
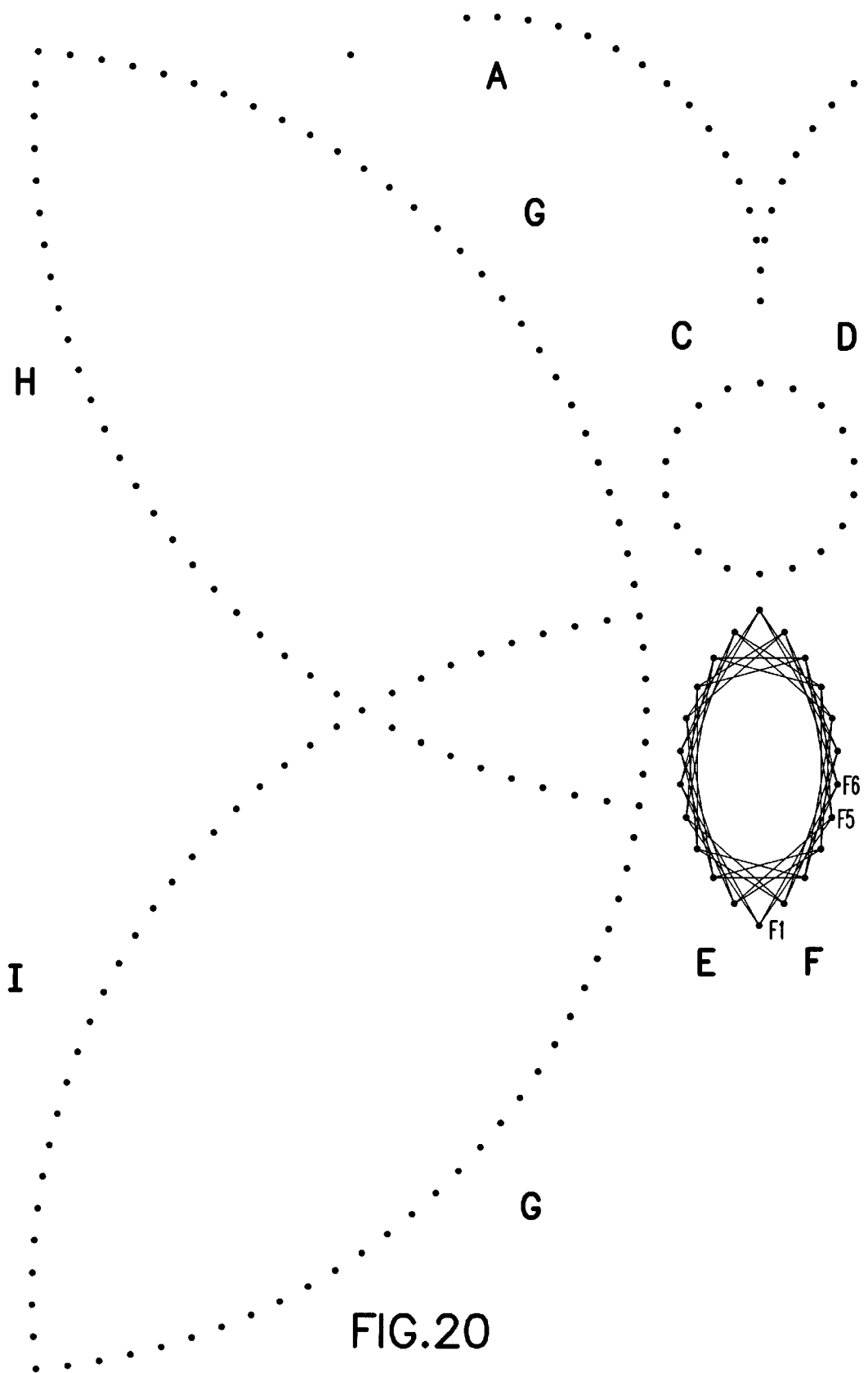
FIG. 20 is an instruction sheet showing complete stringing of the third layer of the body.
Figure 21:
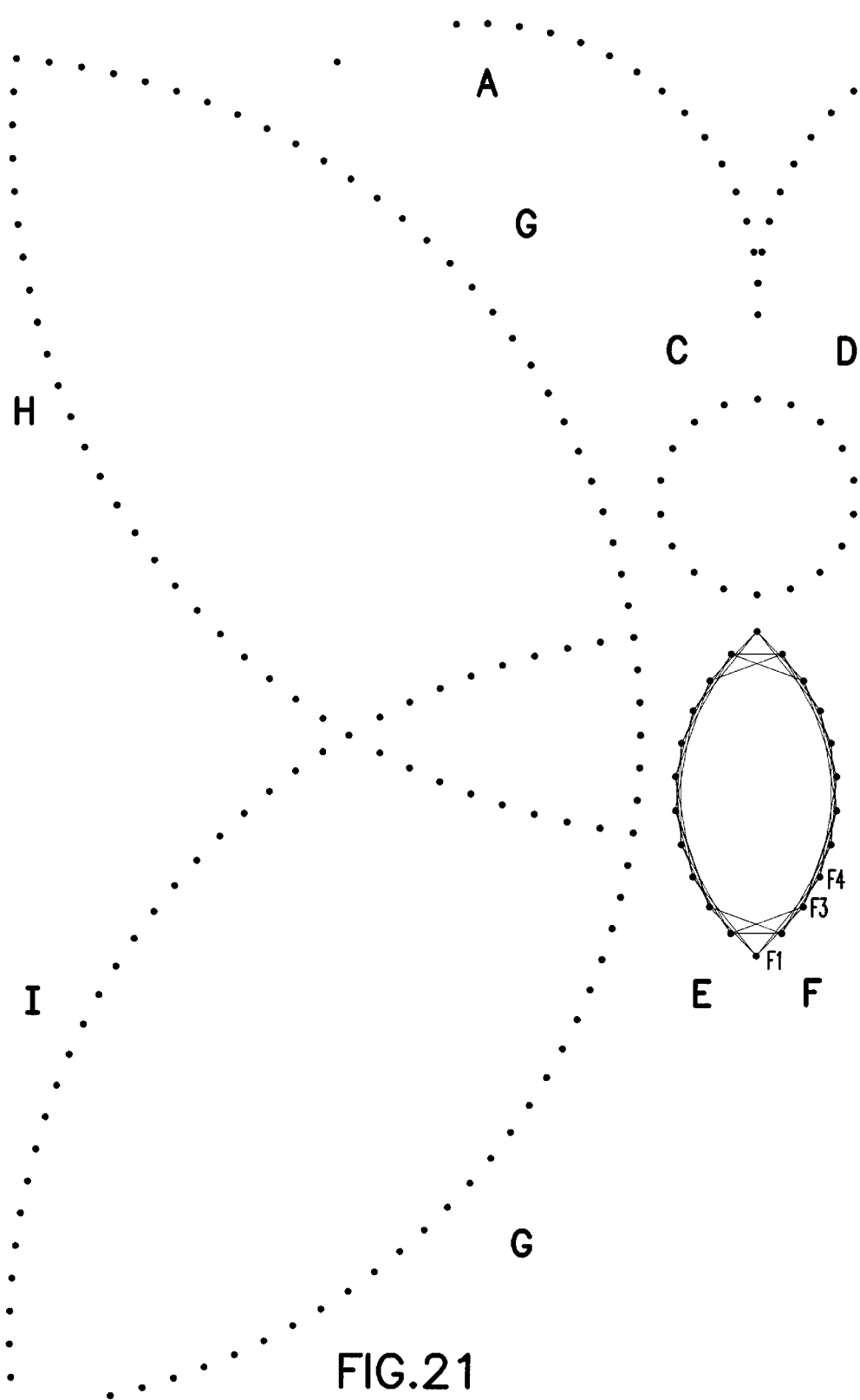
FIG. 21 is an instruction sheet showing complete stringing of the fourth layer of the body.
Figure 22:
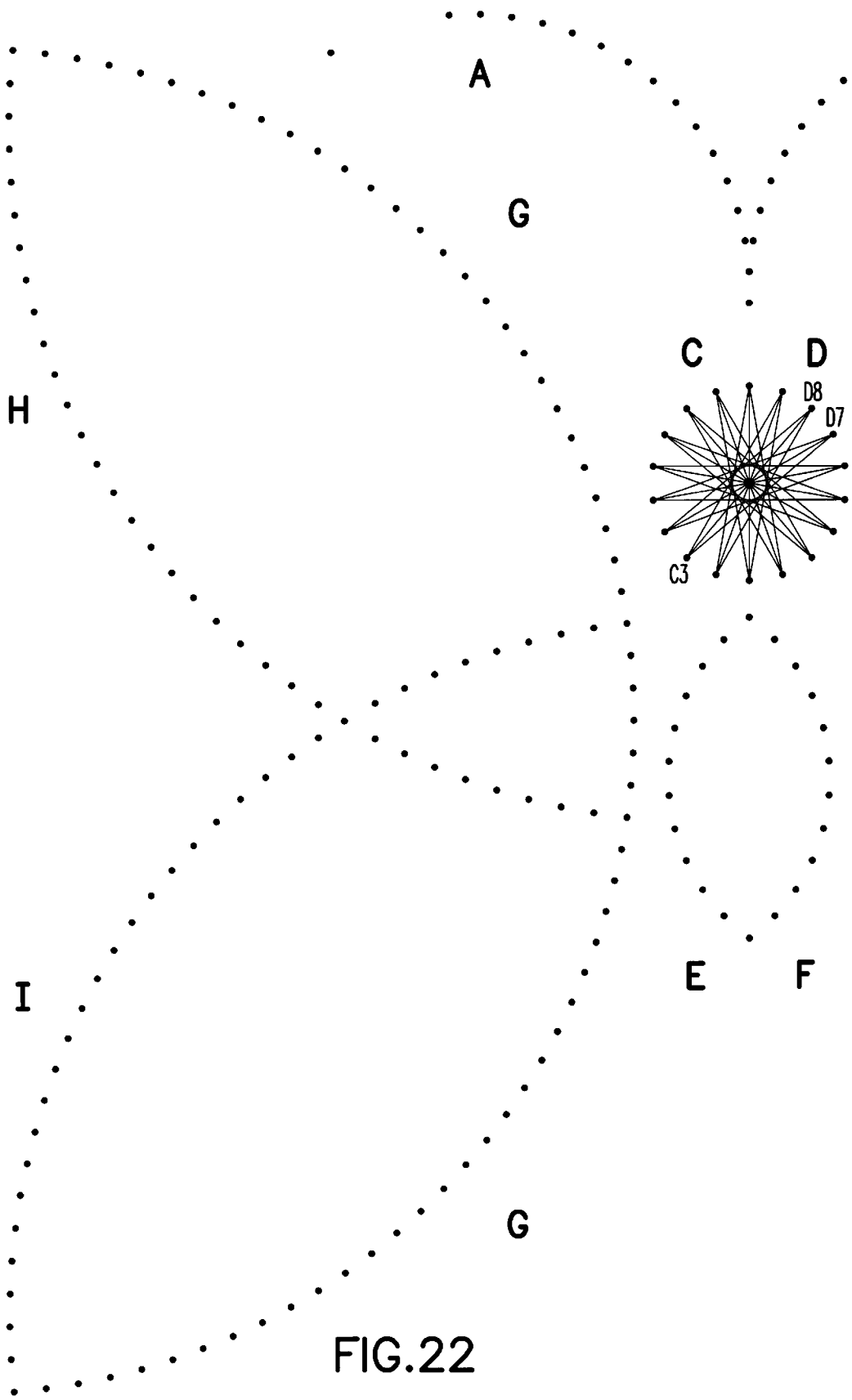
FIG. 22 is an instruction sheet showing complete stringing of the first layer of the head of the butterfly.
Figure 23:
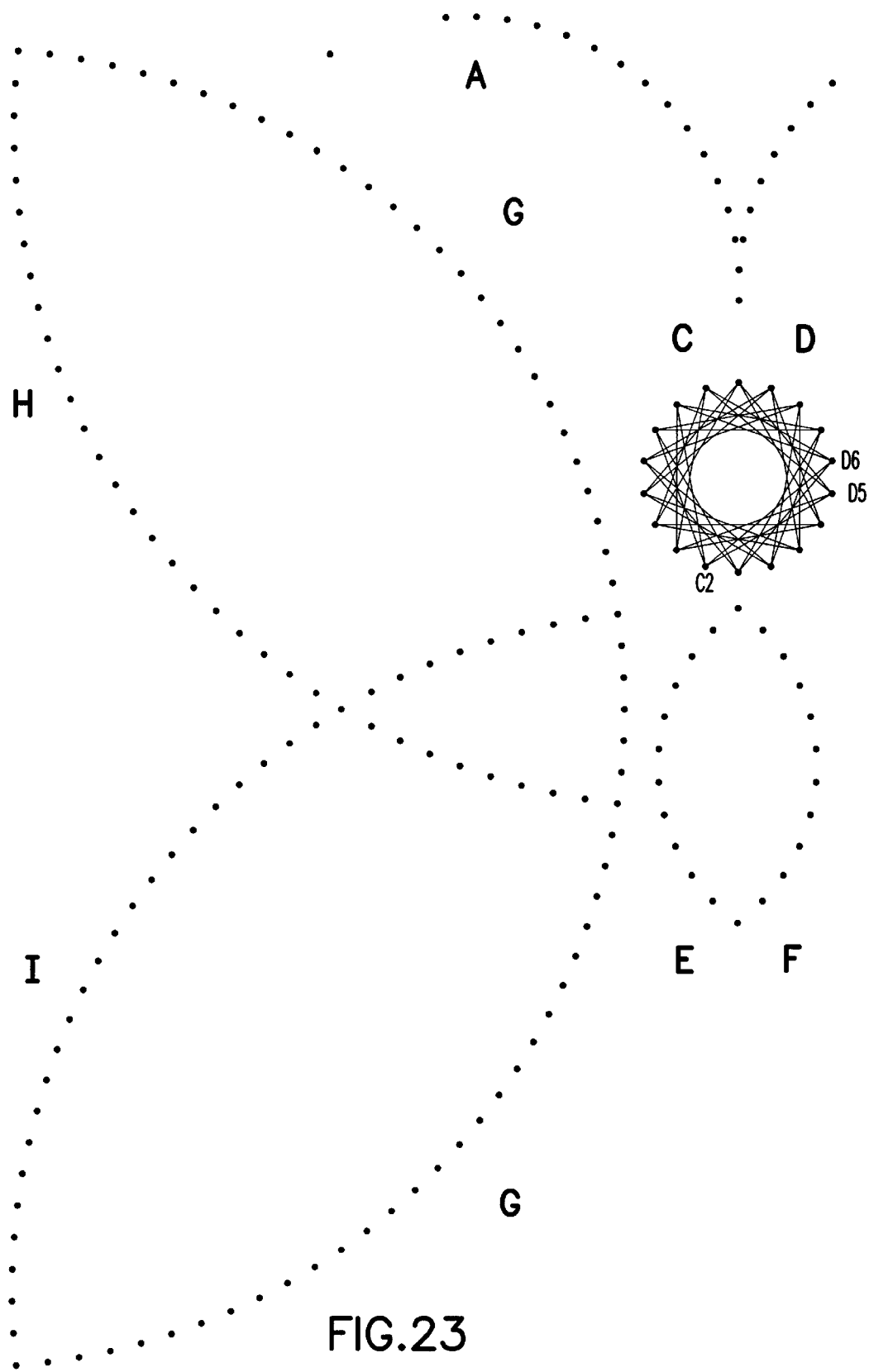
FIG. 23 is an instruction sheet showing complete stringing of the second layer of the head.
Figure 24:
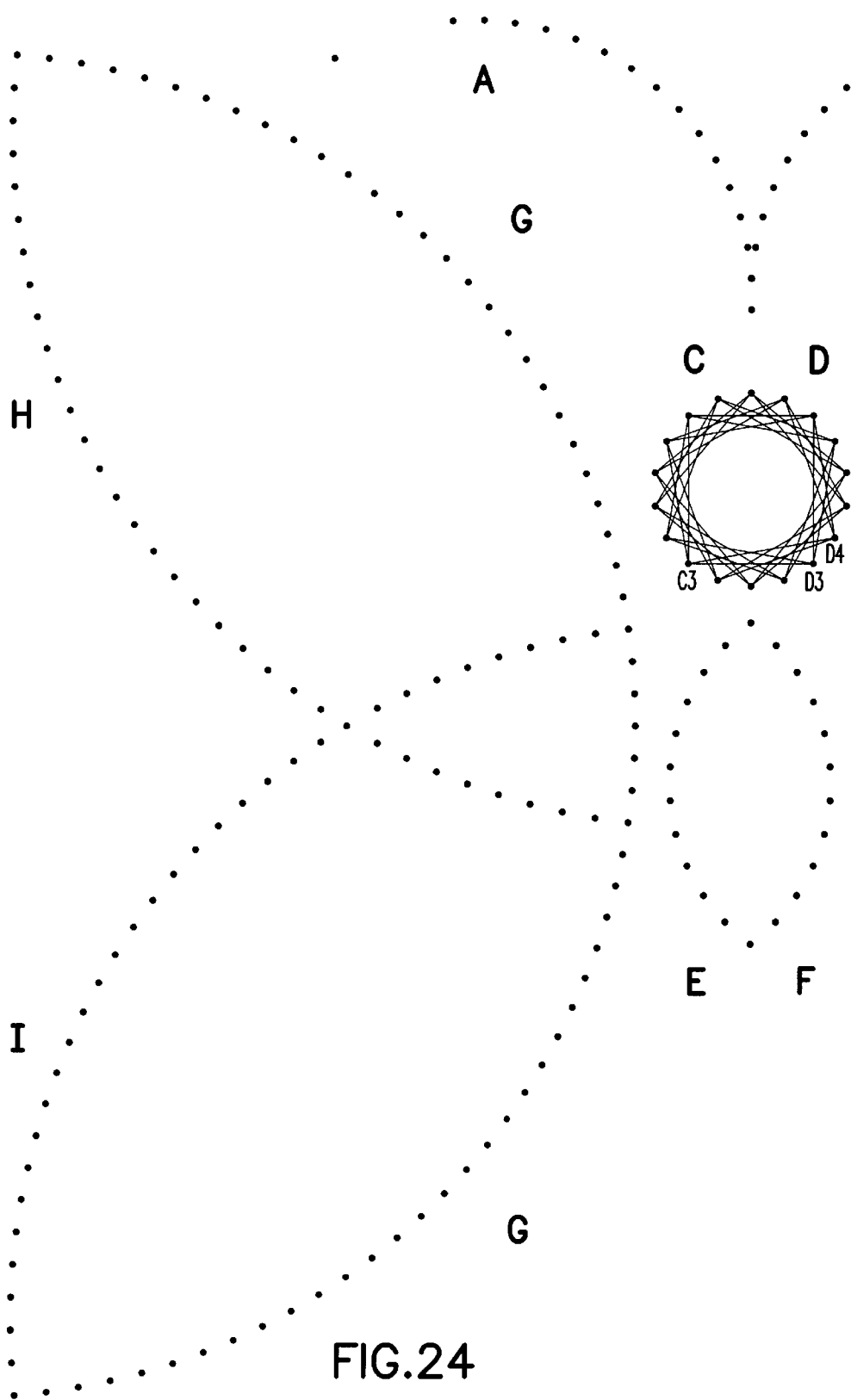
FIG. 24 is an instruction sheet showing complete stringing of the third layer of the head.
Figure 25:
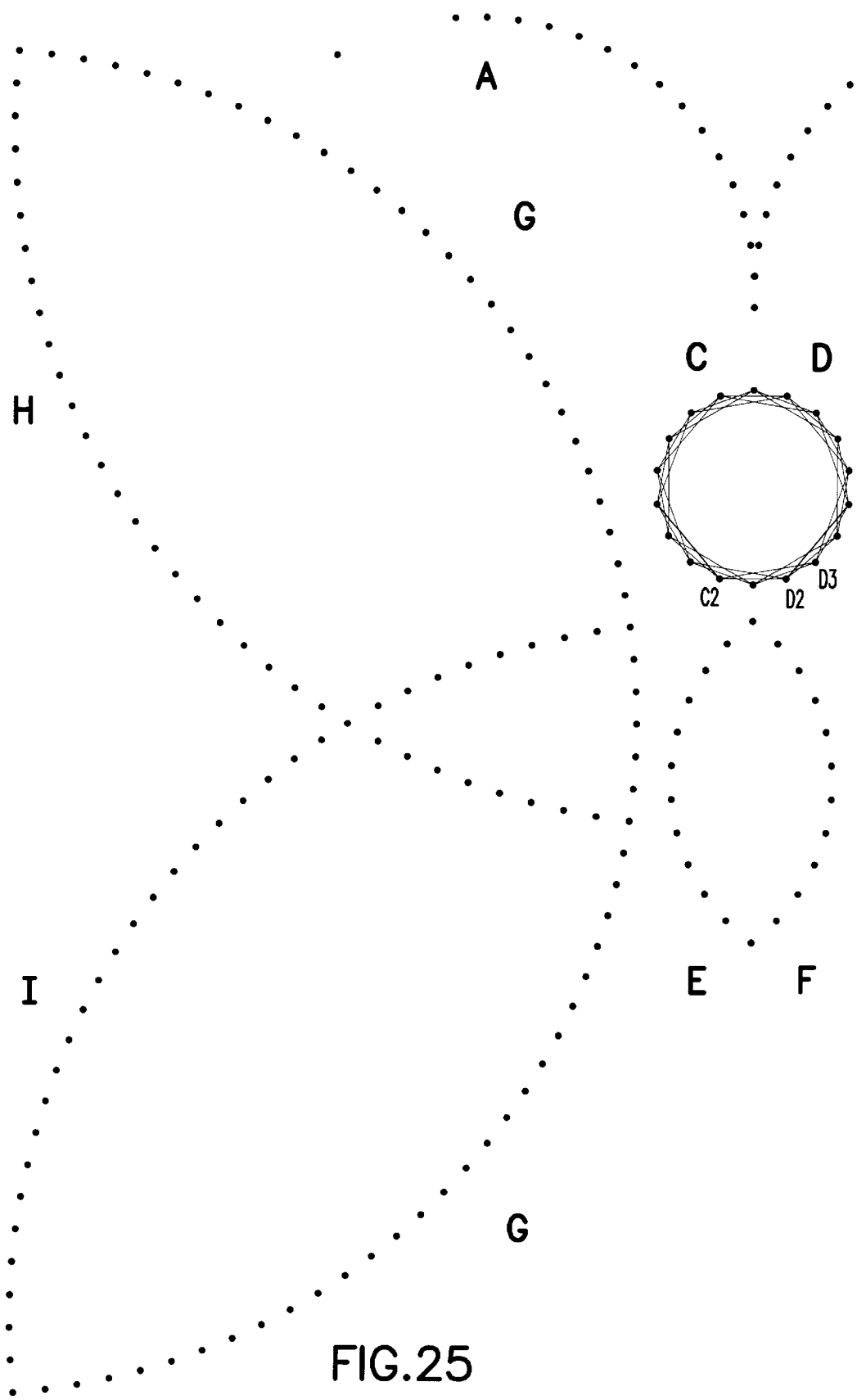
FIG. 25 is an instruction sheet showing complete stringing of the fourth layer of the head.
Figure 26:
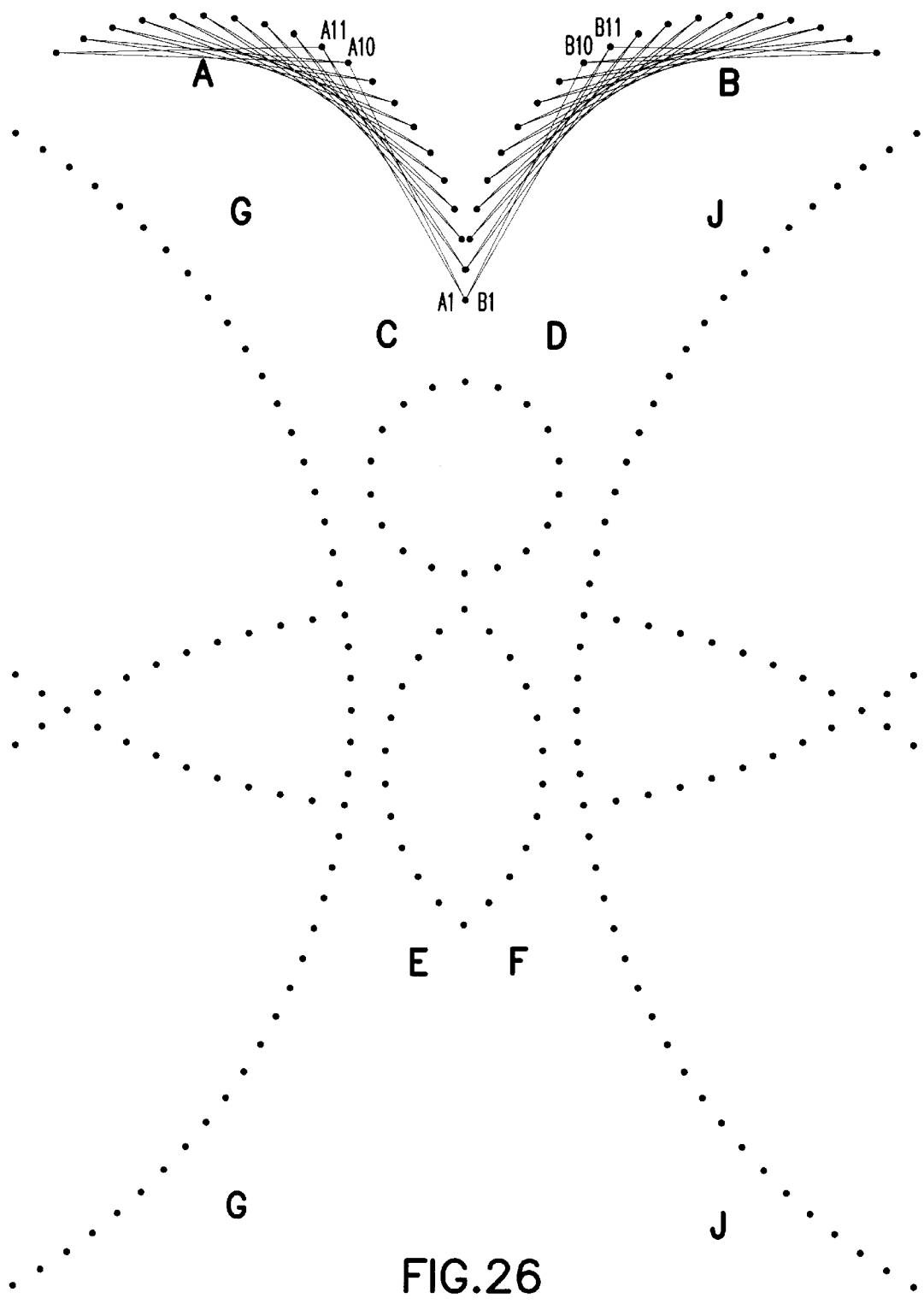
FIG. 26 is an instruction sheet showing complete stringing of the antenna of the butterfly.

Notice that in FIG. 18, ending at F11 leaves F10 visually missing a line of string compared to the other nails. In FIGS. 19, 20, and 21, and others, ending one pin past the starting pin does not easily show the resulting superimposed parallel string line.

TABLE 13

Body:
Make complete circles clockwise.

| layer | Fig. | tie to pin | go to and wrap around | end pin | color |
|---|---|---|---|---|---|
| 1 | 18 | F10 | E3 | F11 | black |
| 2 | 19 | F8 | F1 | F7 | dark blue |
| 3 | 20 | F6 | F1 | F5 | black |
| 4 | 21 | F4 | F1 | F3 | dark blue |

TABLE 14

Head:
Make complete circles clockwise.

| layer | Fig. | tie to pin | go to and wrap around | end pin | color |
|---|---|---|---|---|---|
| 1 | 22 | D8 | C3 | D7 | black |
| 2 | 23 | D6 | C2 | D5 | blue |
| 3 | 24 | D4 | C3 | D3 | black |
| 4 | 25 | D3 | C2 | D2 | blue |

TABLE 15

FIG. 26

A is counterclockwise
B is clockwise
Antenna:

| side | tie to pin | go to and wrap around | end pin | color |
|---|---|---|---|---|
| left | A10 | A1 | A11 | white |
| right | B10 | B1 | B11 | white |

Means for providing instruction for stringing the string can be provided on paper, on electronic media such as CD-ROM, or on other media for convenience of the user.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

Drawing Designators (Informal)
65 kit
69 board, wooden
71 sheet
73 dots, nail location
74 upper surface of board
75 nail
76 fabric
77 tack
78 identification number
79 sheet
81 sheet
64 sheet
66 sheet
68 sheet
70 sheet
72 sheet
80 red yarn
82 yellow yarn
84 green yarn
86 light green yarn
88 dark blue yarn
90 white yarn
92 black yarn
98 butterfly
99 butterfly
100 light blue yarn
102 intermediate blue yarn
104 transitional edge
106 string
108 nail line
116 nail line
120 direction, arrow
122 vertex of lobe 132
124 vertex of lobe 132
126 direction, arrow
128 direction of progression
130 acute angle
132 left lower lobe
134 left upper lobe
136 right lower lobe
138 right upper lobe
140 bulbous edge
142 band 148 circumference of loop 150
150 loop
154 inner circumference
156 outer circumference
162 direction of progression
164 direction of progression
166 direction of progression
170 inner circumference
180 direction of progression
182 direction of progression
184 direction of progression
186 direction of progression
172 inner circumference
174 inner circumference
176 inner circumference
178 inner circumference
192 inner circumference
194 inner circumference

What is claimed is:

1. A kit for making a string design comprising:

a base means for indicating locations on said base for fixing pins in said base in holes to be made by said pins in said base, in a predetermined pattern of equally spaced pins in a line that includes outline by said pins of a loop, means for directing first wrapping of a string from a first pin at one part of the line of pins to a second pin at another part of the line of pins along a first direction of progression, spaced a plurality of pins in the first direction of progression from the first pin, adjacent to the last pin wrapped at said other part of the line to the side of the last pin that is in the first direction of progression, back and fourth in sequence of pin to spaced away adjacent pin, taking an acute angle about each of the pins, forming a layer of string having a first internal diameter of an arc in said loop, so that a first dense layer of string is formed, means for directing second wrapping of a string from a third pin at one part of the line of pins to a fourth pin at another part of the line of pins along a second direction of progression, spaced a plurality of pins in the second direction of progression from the third pin, adjacent to the last pin wrapped in said second wrapping at said other part of the line to the side of the last pin that is in the second direction of progression, back and fourth in sequence of pin to spaced away adjacent pin, taking an acute angle about each of the pins, forming a layer of string having a second internal diameter of an arc in said loop, so that a second dense layer of string is formed which extends over said first dense layer, exposing a portion of the first dense layer adjacent to an edge of the second dense layer forming a sculptured three dimensional shape with said first dense layer.

2. The string art item of claim 1 wherein the second direction of progression is the same direction as the first direction of progression.

3. The string art item of claim 1 wherein the second direction of progression is in a different direction from the first direction of progression.

4. The string art item of claim 1 wherein said first pin is the same one as said third pin.

5. The string art item of claim 1 wherein the first wrapping and the second wrapping are different colors to accentuate the depth.

6. A kit for making a string design, the kit comprising:

a base board means for indicating locations on said board for fixing pins in said board in holes to be made by said pins in said board in a predetermined pattern of equally spaced pins that includes outline by said pins of a loop and diverging from one end of said loop into a first line of pins and a second line of pins, means for directing first wrapping of a string back and forth between the first line of pins and the second line of pins so that the string extends from a pin in the first line to a pin in the second line, in sequence of pin to spaced away adjacent pin in opposite directions on each line, taking an acute angle about each of the pins, forming a first dense layer of string, means for directing second wrapping of a string back and fourth between said first line of pins and said second line of pins so that the string extends from a pin in the first line to a pin in the second line, in sequence of pin to spaced away adjacent pin in opposite directions on each line, taking an acute angle about each of the pins, forming a second dense layer, extending over the first dense layer and exposing a portion of the first dense layer adjacent to an edge of the second dense layer forming a sculptured three dimensional shape with said first dense layer.

7. A three dimensional tactile string art item comprising:

a base a plurality of pins mounted in holes in said base in a predetermined pattern of pins in a line that includes outline by said pins of a loop, a first length of string wrapped around a first pin at one part of the line of pins, extending to a second pin at another part of the line of pins along a first direction of progression, spaced a plurality of pins in the first direction of progression from the first pin, adjacent to the last pin wrapped at said other part of the line to the side of the last pin that is in the first direction of progression, extending back and fourth in sequence of pin to spaced away adjacent pin, taking an acute angle about each of the pins, forming a layer of string having a first internal diameter of an arc in said loop, so that a first dense layer of string is formed, a second length of string wrapped around a third pin at one part of the line of pins, extending to a fourth pin at another part of the line of pins along a second direction of progression, spaced a plurality of pins in the second direction of progression from the third pin, adjacent to the last pin wrapped in said second wrapping at said other part of the line to the side of the last pin that is in the second direction of progression, extending back and fourth in sequence of pin to spaced away adjacent pin, taking an acute angle about each of the pins, forming a layer of string having a second internal diameter of an arc in said loop, so that a second dense layer of string is formed which extends over said first dense layer, exposing a portion of the first dense layer adjacent to an edge of the second dense layer forming a sculptured three dimensional shape with said first dense layer.

8. The string art item of claim 7 wherein said pins are equally spaced in said line.

9. The string art item of claim 7, wherein the distance between the pins is fixed.

10. The string art item of claim 7 wherein said holes are made by said pins inserted in said board in said predetermined pattern according to means for indicating locations on said board.

11. The string art item of claim 7 wherein said holes are made by said pins inserted through means for indicating locations on said board for fixing pins in said base.

12. The string art item of claim 7, further comprising:

means for indicating locations on said base for fixing pins in said base in the predetermined pattern, in holes in said base made by said pins.

13. The string art item of claim 7 wherein said loop is a lobe portion of a wing, said wing comprising a second loop extending symmetrically from said first loop.

14. The string art item of claim 7 wherein the second direction of progression is the same direction as the first direction of progression.

15. The string art item of claim 7 wherein the second direction of progression is in a different direction from the first direction of progression.

16. A winged sculpture comprising:

a plurality of layers of thread, each layer sculptured by stringing to form a thickened arc around a larger diameter opening than the layer below, forming a portion of a wing, and so strung symmetrically, forming a pair of sculptured wings.

* * * * *

UNITED STATES PATENT AND TRADEMARK OFFICE
CERTIFICATE OF CORRECTION

PATENT NO. : 6,149,436
DATED : November 21, 2000
INVENTOR(S) : Tristram C. Dunn

It is certified that error appears in the above-identified patent and that said Letters Patent is hereby corrected as shown below:

In the Drawings:
Sheet 5, Fig. 5, reference numeral "122" applied to the upturned arrow that is adjacent to pins "8a" and "10a" should be --126--.

Figure 8B:
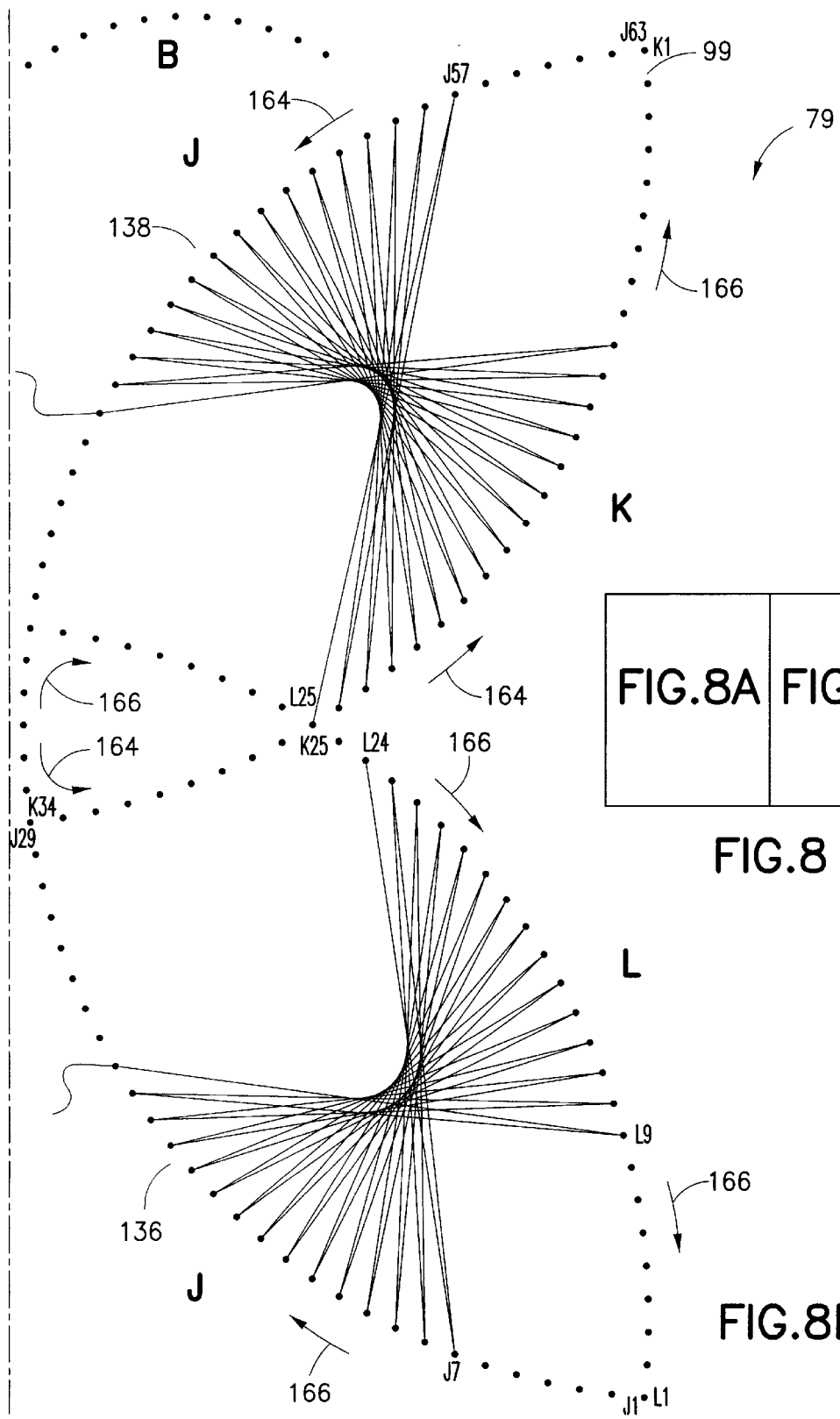

Sheet 9, Fig. 8B, reference numeral "166" applied to the upturned arrow that is on the upper right side of the upper lobe above the letter "K" should be --164--.

UNITED STATES PATENT AND TRADEMARK OFFICE
CERTIFICATE OF CORRECTION

PATENT NO.   : 6,149,436
DATED        : November 21, 2000
INVENTOR(S)  : Tristram C. Dunn It is certified that error appears in the above-identified patent and that said Letters Patent is hereby corrected as shown below:

Column 2, at lines 6 and 18-19, the term "back and fourth" should read --back and forth--.
At column 4, line 13, reference numeral "128" should read --124--.
Column 5, at lines 1 and 6, reference numeral "106" should read --116--.
Column 10, line 58, in line 3 of table 10, designator "014" should be --I14--.

In the Claims:
In claim 1, column 13, at lines 35 and 47-48, the term "back and fourth" should read --back and forth--.
In claim 6, column 14, lines 16-17, the term "back and fourth" should read --back and forth--.
In claim 7, column 14, at lines 39 and 51-52, the term "back and fourth" should read --back and forth--.

Signed and Sealed this

Twenty-fourth Day of April, 2001

NICHOLAS P. GODICI

Attest:

Attesting Officer

Acting Director of the United States Patent and Trademark Office